United States Patent
Iwayama et al.

(10) Patent No.: US 11,256,784 B2
(45) Date of Patent: Feb. 22, 2022

(54) RECORDING MEDIUM RECORDING MANAGEMENT PROGRAM, METHOD, AND RECORDING MEDIUM RECORDING SUPPORT REQUEST PROGRAM

(71) Applicant: FUJITSU LIMITED, Kawasaki (JP)

(72) Inventors: Yutaka Iwayama, Kawasaki (JP); Takahiro Kitajima, Kawasaki (JP); Yukio Osawa, Yasio (JP); Miho Okamoto, Kawasaki (JP); Noriaki Aihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 249 days.

(21) Appl. No.: 16/443,845

(22) Filed: Jun. 17, 2019

(65) Prior Publication Data

US 2019/0311089 A1   Oct. 10, 2019

Related U.S. Application Data

(63) Continuation of application No. PCT/JP2016/087769, filed on Dec. 19, 2016.

(51) Int. Cl.
*G06F 21/10* (2013.01)
*G06F 8/61* (2018.01)
(Continued)

(52) U.S. Cl.
CPC .............. *G06F 21/105* (2013.01); *G06F 8/62* (2013.01); *G06F 11/3476* (2013.01); *G06F 21/10* (2013.01); *G06Q 10/00* (2013.01)

(58) Field of Classification Search
CPC ...... G06F 21/105; G06F 8/62; G06F 11/3476; G06F 21/10; G06Q 10/00
See application file for complete search history.

(56) References Cited

U.S. PATENT DOCUMENTS

| 6,049,670 | A | 4/2000 | Okada et al. |
| 8,407,669 | B2 * | 3/2013 | Yee .................. G06Q 10/06 717/120 |

(Continued)

FOREIGN PATENT DOCUMENTS

| JP | 8-190529 | 7/1996 |
| JP | 2002-157039 | 5/2002 |

(Continued)

OTHER PUBLICATIONS

EESR—Extended European Search Report dated Aug. 6, 2019 for corresponding European Patent Application No. 16924775.6.

(Continued)

*Primary Examiner* — Huan V Doan
(74) *Attorney, Agent, or Firm* — Fujitsu Patent Center

(57) ABSTRACT

A recording medium records a management program allowing a computer to execute a process of: obtaining a support request for first software including first individual information identifying a first device used by a user and a product name of the first software implemented in the first device; and referring to a storage storing second individual information identifying a second device in which second software in a support contract for the user is implemented; and in a case where the second individual information coincident with the first individual information in the support request is not stored in the storage and a number of pieces of the second individual information in the storage is smaller than a number of pieces of support indicating a number of pieces of software supportable based on the support contract, storing the first individual information in the support request to the storage as the second individual information.

12 Claims, 28 Drawing Sheets

(51) Int. Cl.
*G06F 11/34* (2006.01)
*G06Q 10/00* (2012.01)

(56) References Cited

U.S. PATENT DOCUMENTS

| | | | |
|---|---|---|---|
| 2004/0148525 A1* | 7/2004 | Aida | G06F 8/61 |
| | | | 726/28 |
| 2006/0168580 A1* | 7/2006 | Harada | H04L 9/0841 |
| | | | 717/174 |
| 2006/0272031 A1 | 11/2006 | Ache et al. | |
| 2009/0037336 A1 | 2/2009 | Sunata | |
| 2009/0228982 A1* | 9/2009 | Kobayashi | G06F 21/105 |
| | | | 726/26 |
| 2010/0333213 A1* | 12/2010 | Etchegoyen | G06F 21/105 |
| | | | 726/29 |
| 2013/0014100 A1* | 1/2013 | Akiyama | G06F 11/3612 |
| | | | 717/176 |
| 2014/0013449 A1* | 1/2014 | Vijay | H04L 63/0428 |
| | | | 726/29 |
| 2014/0344942 A1* | 11/2014 | Headley | G06F 21/121 |
| | | | 726/26 |
| 2016/0189168 A1 | 6/2016 | Nakamura et al. | |

FOREIGN PATENT DOCUMENTS

| | | |
|---|---|---|
| JP | 2006-106958 | 4/2006 |
| JP | 2007-034437 | 2/2007 |
| JP | 2008-059481 | 3/2008 |
| JP | 2008-250842 | 10/2008 |
| JP | 2008-542877 | 11/2008 |
| JP | 2009-026069 | 2/2009 |
| JP | 2009-037423 | 2/2009 |
| JP | 2009-187499 | 8/2009 |
| JP | 2014-099720 | 5/2014 |
| JP | 2016-126402 | 7/2016 |

OTHER PUBLICATIONS

JPOA—Japanese Office Action dated Mar. 10, 2020 for corresponding Japanese Patent Application No. 2018-557242 with Machine Translation. ** References cited in the JPOA were previously submitted in the IDS filed on Jun. 17, 2019.

International Search Report and Written Opinion of the International Searching Authority, mailed in connection with PCT/JP2016/087769 and dated Mar. 7, 2017 (16 pages).

* cited by examiner

FIG. 5

110 HARDWARE SHIPPING INFORMATION DB

| PRODUCT NAME | SERIAL NUMBER | CUSTOMER COMPANY NAME | SHIPPING DATE |
|---|---|---|---|
| SERVER A | MA001 | COMPANY F | 2016/6/10 |
| SERVER B | MA002 | COMPANY F | 2016/6/10 |
| SERVER A | MA003 | COMPANY F | 2016/6/10 |
| SERVER C | MA004 | COMPANY F | 2016/6/10 |

FIG. 7

130 SUPPORT CONTRACT MANAGEMENT DB

| PRODUCT NAME | CUSTOMER COMPANY NAME | SHIPPING DATE | SUPPORT CONTRACT SPECIFYING NUMBER | SERVICE CONTRACT DATE | SERVICE START DATE | SERVING END DATE |
|---|---|---|---|---|---|---|
| SUPPORT LICENSE α | COMPANY F | 2016/6/12 | SDK001 | 2016/6/15 | 2016/6/20 | 2018/6/20 |
| SUPPORT LICENSE α | COMPANY F | 2016/7/12 | SDK002 | 2016/7/12 | 2016/7/20 | 2017/7/20 |

FIG. 8

151 SOFTWARE INSTALLATION NUMBER EXCESS TABLE

| PRODUCT NAME | VERSION | CUSTOMER COMPANY NAME | SHIPPED NUMBER | NUMBER OF DETECTED INSTALLATIONS | EXCESS FLAG |
|---|---|---|---|---|---|
| SOFTWARE a | 9.0 | COMPANY F | 3 | 1 | 0 |

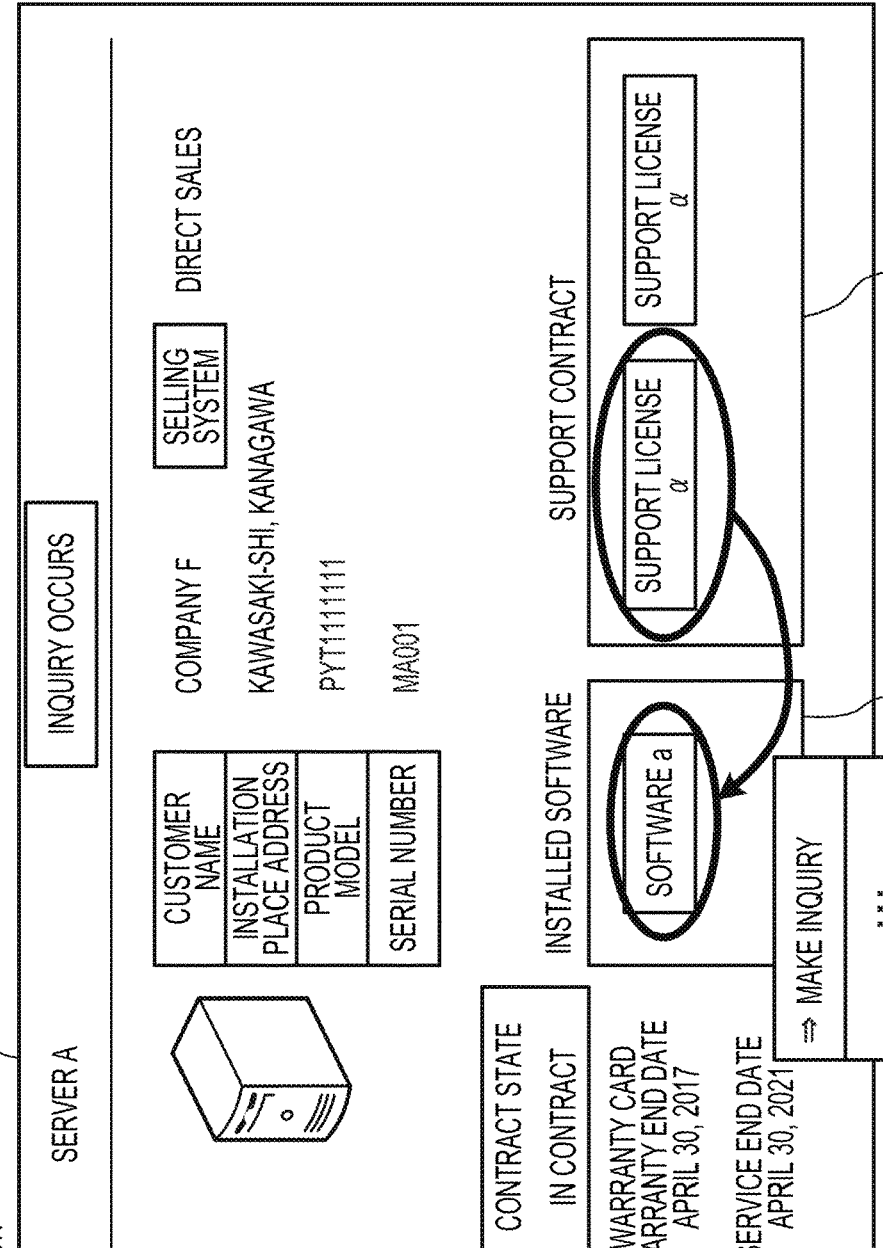

FIG. 13

61 INQUIRY TIME OPERATION SCREEN

SERVER A — INQUIRY OCCURS

- CUSTOMER NAME: COMPANY F
- INSTALLATION PLACE ADDRESS: KAWASAKI-SHI, KANAGAWA
- PRODUCT MODEL: PYT1111111
- SERIAL NUMBER: MA001

SELLING SYSTEM: DIRECT SALES

CONTRACT STATE: IN CONTRACT
WARRANTY CARD
WARRANTY END DATE APRIL 30, 2017
SERVICE END DATE APRIL 30, 2021

INSTALLED SOFTWARE: SOFTWARE a

SUPPORT CONTRACT: WITH SUPPORT CONTRACT

⇒ MAKE INQUIRY
...
61d PULLDOWN MENU

- 61a DEVICE DISPLAY PORTION
- 61b SOFTWARE DISPLAY PORTION
- 61c SUPPORT CONTRACT DISPLAY PORTION

RECORDING MEDIUM RECORDING MANAGEMENT PROGRAM, METHOD, AND RECORDING MEDIUM RECORDING SUPPORT REQUEST PROGRAM

CROSS-REFERENCE TO RELATED APPLICATION

This application is a continuation application of International Application PCT/JP2016/087769 filed on Dec. 19, 2016 and designated the U.S., the entire contents of which are incorporated herein by reference.

FIELD

The embodiments discussed herein relate to a recording medium recording a management program, a method, and a recording medium recording a support request program.

BACKGROUND

When a company operates a computer system, various problems occur. The problem may be caused by various reasons such as mistakes in setting of a device and bugs in software. As a result, it is difficult for the company to independently and quickly respond to all problems which occur. Therefore, there is a service which supports the operation of the computer system.

Related art is disclosed in Japanese Laid-open Patent Publication No. 2014-99720 and Japanese Laid-open Patent Publication No. 8-190529.

SUMMARY

A non-transitory computer-readable recording medium records a management program allowing a computer to execute a process of: obtaining a support request for first software including first individual information which identifies a first device which is used by a user and a product name of the first software which is implemented in the first device; and referring to a storage which stores second individual information which identifies a second device in which second software, which is included in a support contract for the user regarding software having the product name, is implemented; and in a case where the second individual information coincident with the first individual information in the support request is not stored in the storage and a number of pieces of the second individual information in the storage is smaller than a number of pieces of support which indicates a number of pieces of software supportable based on the support contract, storing the first individual information in the support request to the storage as the second individual information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a view illustrating an example of a hardware shipping information DB.

FIG. 7 is a view illustrating an example of a support contract management DB.

FIG. 8 is a view illustrating an example of a software installation number excess table.

FIG. 12 is a view illustrating an example of an inquiry time operation screen.

FIG. 13 is a view illustrating an example of the inquiry time operation screen after support contract is selected.

DESCRIPTION OF EMBODIMENTS

To support the operation of the computer system, there are hardware support and software support. The support for software is performed only for products sold regularly. Since software is easily illegally copied, for example, an identification number for individual specification is set in software. When supporting the software, an operation status of specific software is examined via a network on the basis of the identification number, and it is confirmed that this is usage within a license of use of the software, then the support for the software is performed.

As a technology of supporting the computer system via the network, there is a technology of easily connecting a client operation terminal and a network device using, for example, device specific information. As a technology of preventing illegal copy of software, there is a technology of monitoring illegal copy by managing distribution destinations of distributed software by information including identifiers.

Software advanced support services are provided only to customers who concludes a service contract. The service contract is concluded separately for each software. If there is an individual identification number in the software, the software being a target of the contracted service may be specified by the individual identification number.

On the other hand, there also is a case where a support service targeted to software not having an identification number for individual specification is provided. Conventionally, it is not possible to determine whether the support contract is concluded for each piece of software not having the individual identification number. Therefore, a customer may use one support service with a plurality of pieces of software. For example, suppose a customer purchasing ten pieces of the same type of software, and concluding the support contract for only one of them. When receiving an inquiry about support for trouble from this customer, a support service provider side does not have a means for confirming whether the troubled software is the support target software. Therefore, the customer may receive the support for other arbitrary software with the support contract for one software.

For example, the presence or absence of the support contract for software not having an individual identification number may be determined.

Hereinafter, embodiments are described with reference to the drawings. Note that each embodiment may be implemented by combining a plurality of embodiments within a scope without contradiction.

First Embodiment

First, a first embodiment is described. The first embodiment is a management device capable of determining presence or absence of a support contract for software not having an individual identification number.

Figure 1:
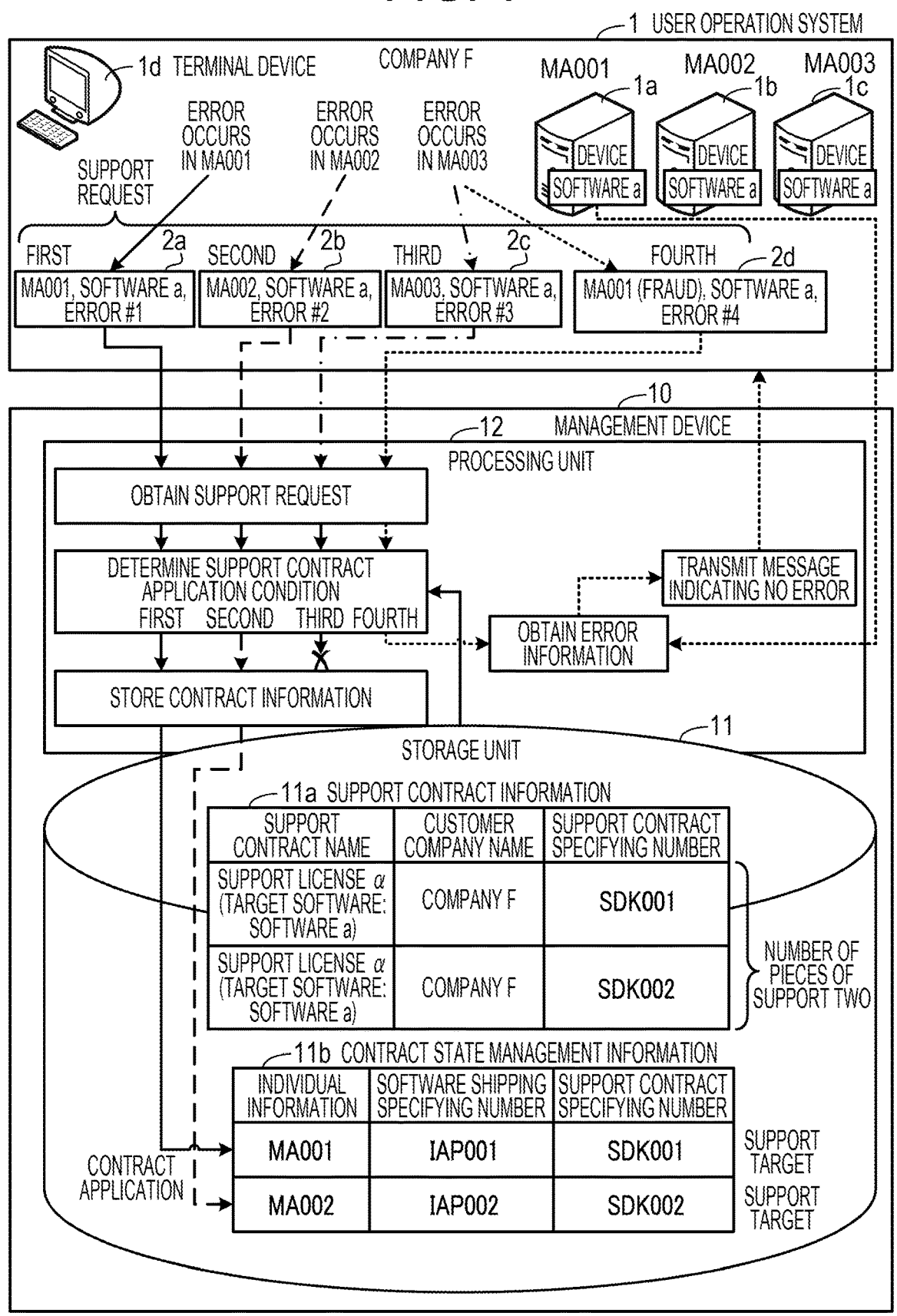
FIG. 1 is a view illustrating a functional configuration example of a device according to a first embodiment.

FIG. 1 is a view illustrating a functional configuration example of the device according to the first embodiment. A management device 10 is connected to a user operation system 1 managed by a user via a network. The user operation system 1 includes a plurality of devices 1a, 1b, and 1c in which software having a product name "software a" is implemented, and a terminal device id used by the user for support requests 2a to 2d. The support request includes individual information for identifying the device used by the user, the product name of the software implemented in the device, and error information indicating an occurred error. Herein, software being a target of support in the support request is first software, a device in which the first software is implemented is a first device, and individual information of the first device is first individual information.

The devices 1a, 1b and 1c are, for example, computers such as servers. Individual information is assigned to the devices 1a, 1b and 1c. The individual information is a serial number assigned at the time of manufacture, a hardware address used for communication and the like.

The management device 10 is a computer managed by a support service company that supports the software having the product name "software a". The management device 10 includes a storage unit 11 and a processing unit 12. The storage unit 11 is, for example, a memory or a storage device included in the management device 10. The processing unit 12 is, for example, a processor or an arithmetic circuit similar to the processor included in the management device 10.

The storage unit 11 stores support contract information 11a and contract state management information 11b. The support contract information 11a is information regarding the support contract for the software having the product name "software a" concluded with the user. In the support contract information 11a, for example, a support contract specifying number for identifying the support contract is set for each support contract for one software. The number of pieces of supportable software (number of pieces of support) is indicated by the number of support contract specifying numbers.

The contract state management information 11b stores individual information for identifying the device in which the software to which the support contract concluded with the user regarding the software having the product name "software a" is applied is implemented. Herein, software to which the support contract is applied is second software, a device in which the second software is implemented is a second device, and individual information of the second device is second individual information. In the example in FIG. 1, the devices 1a and 1b correspond to the second devices, and individual information "MA001" and "MA002" of the devices 1a and 1b are indicated in the contract state management information 11b as the second individual information. With the second individual information, for example, a software shipping specifying number for specifying the software implemented in the second device and the support contract specifying number for identifying the support contract applied to the software are associated.

In response to the support requests 2a to 2d from the terminal device 1d, the processing unit 12 determines presence or absence of applicable support contracts. For example, the processing unit 12 obtains the support requests 2a to 2d from the terminal device 1d. Next, the processing unit 12 refers to the storage unit 11 and determines an application condition of the support contract. When determining the application condition, for example, the processing unit 12 determines whether the second individual information which coincides with the first individual information indicated in the support request is not stored in the storage unit 11 and the number of pieces of second individual information stored in the storage unit 11 is smaller than the number of pieces of support. In a case where the application condition is satisfied, the processing unit 12 stores the first individual information indicated in the support request in the storage unit 11 as the second individual information.

In the example in FIG. 1, an error first occurs in the device 1a, and the first support request 2a is output from the terminal device 1d. The processing unit 12 which obtains the support request 2a determines that the application condition of the support contract is satisfied and applies the support contract of a support contract specifying number "SDK001" to the software implemented in the device 1a. Then, the processing unit 12 sets first individual information "MA001" indicated in the support request 2a as the second individual information in the contract state management information 11b. As a result, the support request 2a is validly accepted, and support corresponding to the support request 2a is performed.

An error second occurs in the device 1b, and the second support request 2b is output from the terminal device 1d. The processing unit 12 which obtains the support request 2b determines that the application condition of the support contract is satisfied and applies the support contract of a support contract specifying number "SDK002" to the software implemented in the device 1b. Then, the processing unit 12 sets first individual information "MA002" indicated in the support request 2b as the second individual information in the contract state management information 11b. As a result, the support request 2b is validly accepted, and support corresponding to the support request 2b is performed.

An error third occurs in the device 1c, and the third support request 2c is output from the terminal device 1d. Since the number of pieces of second individual information reaches the number of pieces of support (two), the processing unit 12 which obtains the support request 2c determines that the application condition of the support contract is not satisfied and refuses to apply the support contract to the software implemented in the device 1c. In this case, the processing unit 12 outputs, for example, a message requesting an additional support contract to the terminal device 1d.

At that time, the user might falsify the device in which the error occurs. For example, suppose that the support request 2d including the individual information "MA001" of the device 1a as the first individual information is transmitted from the terminal device 1d even though the error occurs in the device 1c. In this case, the processing unit 12 which receives the support request 2d recognizes that the support contract of the support contract specifying number "SDK001" is already applied to the software implemented in the device 1a indicated in the first individual information with reference to the contract state management information 11b.

Then, the processing unit 12 accesses the device 1a and obtains error information of the software having the product name "software a" implemented in the device 1a. The processing unit 12 determines whether the error information which coincides with the error information included in the support request 2d is obtained from the device 1a. In a case where the coincident error information may be obtained, it may be determined that the support request is valid. In the example in FIG. 1, it is the device 1c in which the error actually occurs, so that it is not possible to obtain the coincident error information. In this case, the processing unit 12 transmits a message indicating that no error occurs to the terminal device 1d.

In this manner, the presence or absence of the support contract for the software not having the individual identification number may be adequately determined. That is, in the first embodiment, in a case where the support contract is applied to the software, the management device 10 stores the individual information of the device in which the software is implemented as the second individual information in association with the applied support contract. Thereafter, the management device 10 determines that there is the support contract for the support request for the software implemented in the device indicated in the second individual information.

The number of pieces of individual information which may be stored as the second individual information is up to the number (number of pieces of support) supportable by the support contract. Therefore, even if the user makes the support request for the software out of the number of pieces of software with the support contract, execution of the support exceeding the number of pieces of support is suppressed.

Furthermore, since the management device 10 collates the error information, this may detect that the device is incorrect in a case where the user falsifies the device in which the error occurs. As a result, it is possible to suppress the support of the software out of an applicable range of the support contract due to user's fraud.

Note that the contract state management information 11b of the storage unit 11 stores one of the support contract specifying numbers corresponding to the number of pieces of support in association with the second individual information of each of the second devices. In this case, the processing unit 12 which obtains the support request confirms, for example, that there is no second individual information associated with the support contract specifying number which coincides with the first individual information and there is at least one support contract specifying number not associated with the second individual information. When confirming this, the processing unit 12 may store one of the support contract specifying numbers not associated with the second individual information in the storage unit 11 in association with the first individual information. In this manner, by storing new second individual information only in a case where there is the support contract specifying number not associated with the second individual information, it is possible to assure that the number of pieces of software to be supported does not exceed the number of pieces of support indicated in the support contract.

It is also possible to allow the terminal device 1d of the user to display that there is at least one support contract specifying number not associated with the second individual information, and notify the user of the presence of the applicable support contract. For example, in a case where the number of pieces of second individual information is smaller than the number of pieces of support, the processing unit 12 transmits screen data displaying a first object indicating the support contract a support application target of which is not determined yet and a second object indicating the first device to the terminal device 1d used by the user. On the basis of the screen data, the first object and the second object are displayed on a screen of the terminal device 1d. As a result, the user may easily recognize that there is the support contract applicable to the software implemented in the first device.

For example, the terminal device 1d transmits the support request for the first software including the first individual information for identifying the first device and the product name of the first software implemented in the first device to the management device 10 according to an input associating the first object with the second object. This makes it easy to perform the support request. Also, in the management device 10, only the support request based on the association between the first object and the second object in the terminal device 1d is accepted. As a result, it is possible to suppress the support request exceeding the support contract from being issued. For example, it is possible to suppress the occurrence of the support request such as the support request 2c illustrated in FIG. 1, and to reduce a wasteful process.

Furthermore, the management device 10 may monitor presence or absence of installation of the software having the product name "software a" on each of the devices 1a, 1b and 1c. In this case, one of the software shipping specifying numbers as many as the number of pieces of software of the product name sold to the user is stored in the storage unit 11 in association with individual information (implemented individual information) for identifying the device (implemented device) in which the software having the product name is implemented among the devices owned by the user. It is possible to distinguish the implemented individual information associated with the support contract specifying number among the stored pieces of implemented individual information as the second individual information. In this case, the processing unit 12 stores in the storage unit 11 the support contract specifying number not associated with the implemented individual information in association with the implemented individual information coincident with the first individual information indicated in the support request.

In this manner, by assign the software shipping specifying number to the software each time the software is installed on any of the devices, it is possible to manage the software with the software shipping specifying number thereafter. For example, a correspondence relationship between the software and the support contract applied to the software may be represented by the correspondence relationship between the software shipping specifying number and the support contract specifying number.

Furthermore, the management device 10 may monitor the presence or absence of uninstallation of the software having the product name "software a" from each of the devices 1a, 1b and 1c. For example, in a case where the processing unit 12 detects that the software having the product name "software a" is uninstalled from the device owned by the user, this deletes the second individual information which coincides with the individual information which identifies the device from which the uninstallation is performed from the storage unit 11. The uninstalled software might be installed on another device. In this case, the processing unit 12 of the management device 10 detects that the uninstalled software is installed on another device. Then, the processing unit 12 stores the individual information for identifying the installed device in the storage unit 11 as new second individual information in association with the support contract specifying number associated with the second individual information deleted at the time of uninstallation.

As a result, even in a case where the device which executes the software to which the support contract is applied is changed, the support contract for the software may be maintained.

Furthermore, in a case where the processing unit 12 detects that the software having the product name "software a" is installed on the device owned by the user, this may count up the number of detected installations indicating the number of devices on which the software having the product name is installed. Then, in a case where the number of detected installations exceeds the number of pieces of software having the product name shipped to the user, the processing unit 12 outputs a message indicating excess in number of installations. As a result, it is possible to suppress the use of the software exceeding the shipped number.

Note that a function of the management device 10 may be realized, for example, by allowing the management device 10 to execute a management program. Also, a function of the terminal device 1d may be realized, for example, by allowing the terminal device 1d to execute a support request program.

Second Embodiment

Next, a second embodiment is described.

Figure 2:
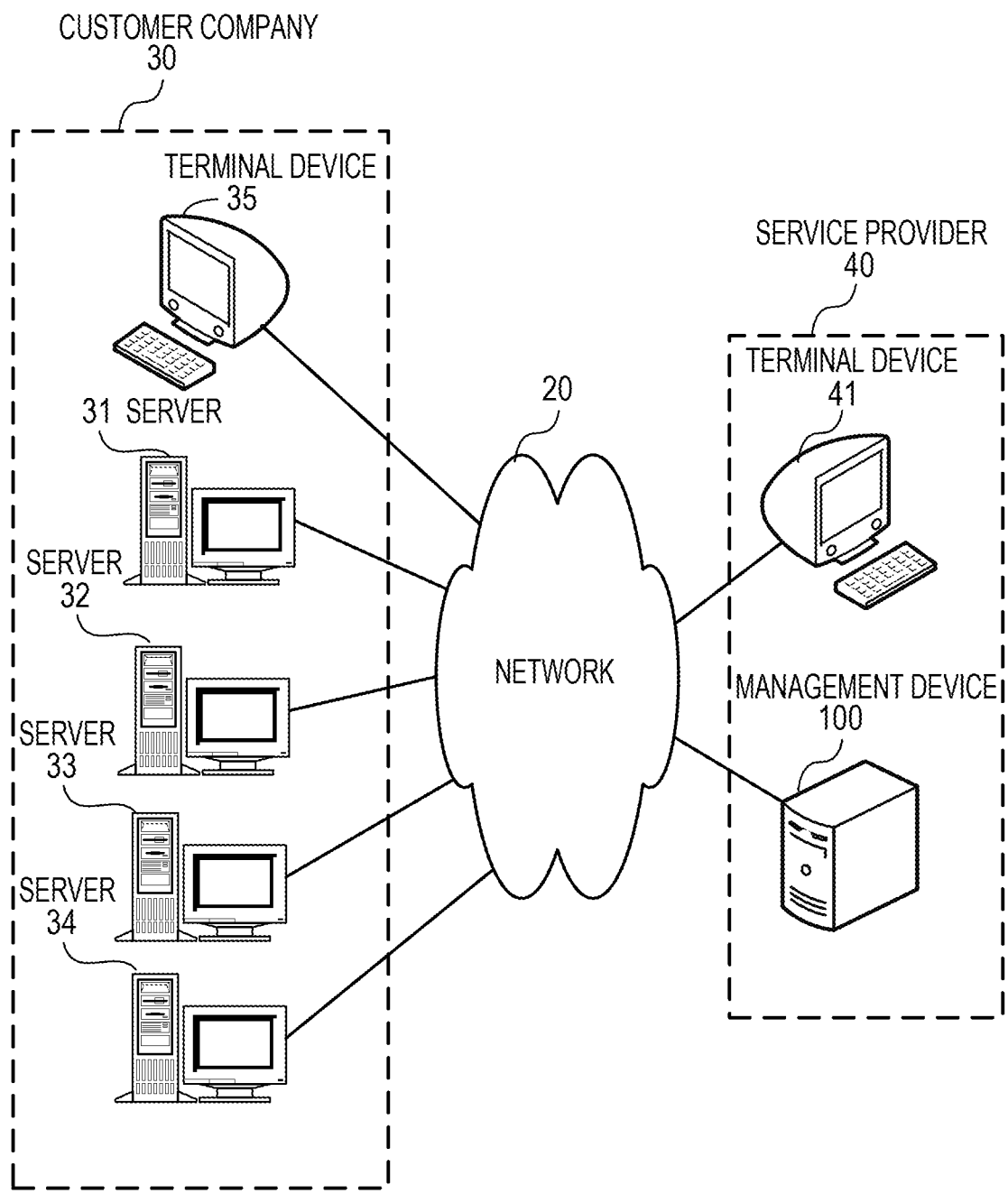
FIG. 2 is a view illustrating a system configuration example according to a second embodiment.

FIG. 2 is a view illustrating a system configuration example according to the second embodiment. A customer company 30 receives various services regarding a computer system from a service provider 40. For example, the customer company 30 purchases servers 31 to 34 such as computers from the service provider 40 and receives maintenance services of the servers 31 to 34 by the service provider 40. The customer company 30 also purchases software to be installed on each of the servers 31 to 34 from the service provider 40. Then, the customer company 30 receives a support service of the purchased software from the service provider 40. For example, the customer company 30 accesses a management device 100 by using a terminal device 35 connected to a network 20, and designates the software to be supported in the support contract. Then, the customer company 30 inquires of the service provider 40 about a troubleshooting method concerning the software to be supported.

The service provider 40 provides the maintenance of the servers 31 to 34 delivered to the customer company 30 and the support service of the software installed on each of the servers 31 to 34. The service is provided via the network 20, for example. In this case, a terminal device 41 and the management device 100 on a side of the service provider 40 are connected to the servers 31 to 34 in the customer company 30 via the network 20.

The terminal device 41 is a computer used by an operator in a call center of the service provider 40. The operator confirms a type of the servers 31 to 34 sold to the customer company 30, a type of the software, a contract content of the support service of the software using the terminal device 41. Then, the operator receives the inquiry about the support of the software and performs the support for the inquiry within the scope of the contract. For example, the service provider 40 issues a support license of the software to the customer company 30 according to the contract of the support service. The support license of the software indicates a right to receive the support for the software.

The management device 100 is a computer which manages the support license of the software sold to the customer company 30.

Note that the servers 31 to 34 illustrated in FIG. 2 are an example of the devices 1a, 1b and 1c described in the first embodiment. The management device 100 illustrated in FIG. 2 is an example of the management device 10 described in the first embodiment. The terminal device 35 or the terminal device 41 illustrated in FIG. 2 is an example of the terminal device id described in the first embodiment.

Figure 3:
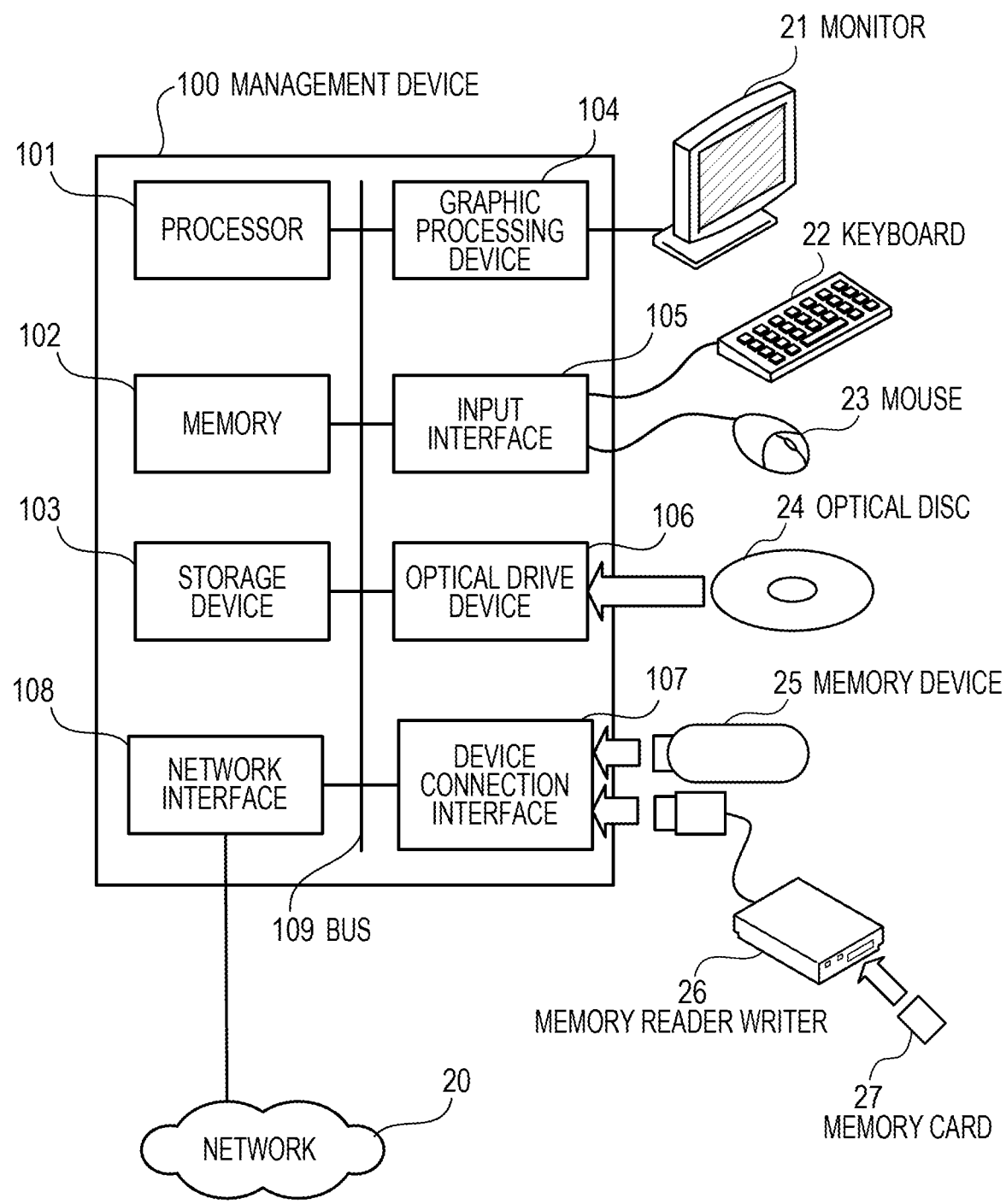
FIG. 3 is a view illustrating a configuration example of hardware of a management device.

FIG. 3 is a view illustrating a configuration example of hardware of the management device. An entire management device 100 is controlled by a processor 101. A memory 102 and a plurality of peripheral devices are connected to the processor 101 via a bus 109. The processor 101 may also be a multiprocessor. The processor 101 is, for example, a central processing unit (CPU), a micro processing unit (MPU), or a digital signal processor (DSP). At least a part of functions realized by the processor 101 executing the program may be realized by an electronic circuit such as an application specific integrated circuit (ASIC) and a programmable logic device (PLD).

The memory 102 is used as a main storage device of the management device 100. In the memory 102, at least a part of an operating system (OS) program and an application program to be executed by the processor 101 is temporarily stored. Also, in the memory 102, various data required for processing by the processor 101 are stored. As the memory 102, for example, a volatile semiconductor storage device such as a random access memory (RAM) is used.

The peripheral devices connected to the bus 109 include a storage device 103, a graphic processing device 104, an input interface 105, an optical drive device 106, a device connection interface 107, and a network interface 108.

The storage device 103 writes and reads data electrically or magnetically to and from a built-in recording medium. The storage device 103 is used as an auxiliary storage device of the computer. The storage device 103 stores the OS program, application program, and various data. Note that, as the storage device 103, for example, a hard disk drive (HDD) or a solid state drive (SSD) may be used.

To the graphic processing device 104, a monitor 21 is connected. The graphic processing device 104 displays an image on a screen of the monitor 21 according to an instruction from the processor 101. As the monitor 21, there are a display device using a cathode ray tube (CRT), a liquid crystal display device and the like.

To the input interface 105, a keyboard 22 and a mouse 23 are connected. The input interface 105 transmits signals transmitted from the keyboard 22 and the mouse 23 to the processor 101. Note that the mouse 23 is an example of a pointing device, and other pointing devices may also be used. Other pointing devices include a touch panel, a tablet, a touch pad, a track ball and the like.

The optical drive device 106 reads data recorded on an optical disc 24 by using laser light or the like. The optical disc 24 is a portable recording medium on which data is recorded so as to be readable by reflection of light. As the optical disc 24, there are a digital versatile disc (DVD), a DVD-RAM, a compact disc read only memory (CD-ROM), a CD-recordable (R)/rewritable (RW) and the like.

The device connection interface 107 is a communication interface for connecting the peripheral devices to the management device 100. For example, to the device connection interface 107, a memory device 25 and a memory reader/writer 26 may be connected. The memory device 25 is a recording medium having a communication function with the device connection interface 107. The memory reader/writer 26 is a device which writes data to the memory card 27 or reads data from the memory card 27. The memory card 27 is a card type recording medium.

The network interface 108 is connected to the network 20. The network interface 108 exchanges data with another computer or a communication device via the network 20.

With the hardware configuration as described above, it is possible to realize a processing function according to the second embodiment of the management device 100. Note that the servers 31 to 34 and the terminal device 41 may also be realized by hardware similar to that of the management device 100 illustrated in FIG. 3. The device described in the first embodiment may also be realized by hardware similar to that of the management device 100 illustrated in FIG. 3.

The management device 100 realizes the processing function of the second embodiment by executing, for example, a program recorded in a computer-readable recording medium. A program in which a processing content to be executed by the management device 100 is described may be recorded in various recording media. For example, a program to be executed by the management device 100 may be stored in the storage device 103. The processor 101 loads at least a part of the program in the storage device 103 on the memory 102 and executes the program. It is also possible to record the program to be executed by the management device 100 in a portable recording medium such as the optical disc 24, the memory device 25, and the memory card 27. The program stored in the portable recording medium may be executed after being installed on the storage device 103, for example, by control of the processor 101. Also, the processor 101 may read the program directly from the portable recording medium and execute.

Next, a function implemented in each device for managing the support license of the software is described.

Figure 4:
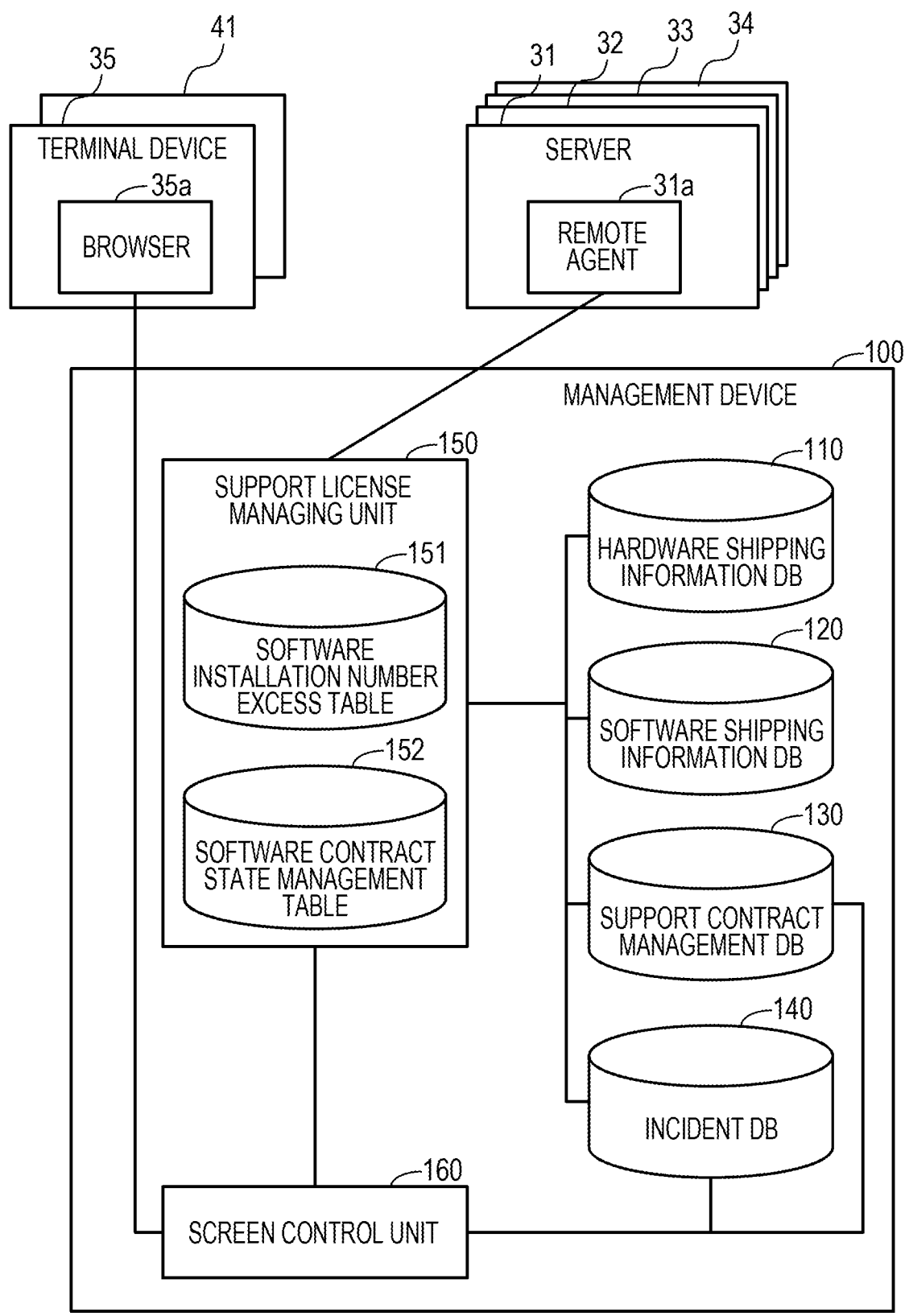
FIG. 4 is a block diagram illustrating an example of a function of each device.

FIG. 4 is a block diagram illustrating an example of the function of each device. The server 31 in the customer company 30 includes a remote agent 31a. When the software is installed, the remote agent 31a transmits installation information indicating the installation to the management device 100. Also, when the software is uninstalled, the remote agent 31a transmits uninstallation information indicating the uninstallation to the management device 100. Furthermore, the remote agent 31a transmits an error log of the software to the management device 100. Each of the servers 32 to 34 also has a function similar to that of the server 31.

The terminal device 35 owned by the customer company 30 includes a browser 35a. The browser 35a accesses the management device 100 via a world wide web (WWW) and displays contents provided by the management device 100. The terminal device 41 owned by the service provider 40 also has the function similar to that of the terminal device 35.

The management device 100 includes a hardware shipping information database (DB) 110, a software shipping information DB 120, a support contract management DB 130, an incident DB 140, a support license managing unit 150, and a screen control unit 160.

The hardware shipping information DB 110 is a database which stores information regarding the servers 31 to 34 sold to the customer company 30. The software shipping information DB 120 is a database which stores information regarding the software sold to the customer company 30. The support contract management DB 130 is a database which stores information regarding the support contract of the software concluded with the customer company 30. The incident DB 140 is a database which stores information regarding an error message generated in each of the servers 31 to 34.

The support license managing unit 150 manages the support license of the software sold to the customer company 30. For example, the support license managing unit 150 manages the support license using a software installation number excess table 151 and a software contract state management table 152. The software installation number excess table 151 is a data table which manages the number of installations on the servers 31 to 34 in the customer company 30 for each software product. The software contract state management table 152 is a data table which manages the presence or absence of the support contract for each software sold to the customer company 30.

Also, the support license managing unit 150 may access each of the servers 31 to 34 delivered to the customer company 30 via the network 20. For example, in the support license managing unit 150, an IP address of the server is registered in association with a serial number of each of the servers 31 to 34. Then, the support license managing unit 150 may collect the information of installation or uninstallation of the software and an error log output by the installed software from the servers 31 to 34.

The screen control unit 160 allows the browser 35a of the terminal device 35 in the customer company 30 to display the information regarding the servers 31 to 34 and the software sold to the customer company 30 and the support contract concluded with the customer company 30. The screen control unit 160 may also allow a browser in the terminal device 41 used by the operator in the service provider 40 to display the information regarding the servers 31 to 34 and the software sold to the customer company 30 and the support contract concluded with the customer company 30.

Note that the function of each element illustrated in FIG. 4 may be realized, for example, by allowing the computer to execute a program module corresponding to the element.

Next, with reference to FIGS. 5 to 9, data stored in each DB or table in the management device 100 is specifically described.

FIG. 5 is a view illustrating an example of the hardware shipping information DB. In the hardware shipping information DB 110, a record indicating hardware shipping information of the server sold to the customer company 30 is stored. The hardware shipping information includes the product name, the serial number, a customer company name, and a shipping date. The product name is a name of the server which is sold. The serial number is an individual identification number for uniquely identifying the sold server. The customer company name is a name of the customer company 30. The shipping date is a date at which the server is shipped to the customer company 30.

Figure 6:
FIG. 6 is a view illustrating an example of a software shipping information DB.

FIG. 6 is a view illustrating an example of the software shipping information DB. In the software shipping information DB 120, a record indicating software shipping information of the software sold to the customer company 30 is stored. The software shipping information includes the product name, a version, a product code, the customer company name, the shipping date, and the software shipping specifying number. The product name is a name of the software which is sold. The version is a version number of the software which is sold. The product code is an identifier for identifying a product type of the software which is sold. The customer company name is a name of the customer company 30. The shipping date is the date at which the software is shipped to the customer company 30. The software shipping specifying number is an individual identification number which uniquely identifies the shipped software.

FIG. 7 is a view illustrating an example of the support contract management DB. In the support contract management DB 130, a record indicating the content of the support contract of the software concluded with the customer company 30 is stored. The content of the support contract includes the product name, the customer company name, the shipping date, the support contract specifying number, a service contract date, a service start date, and a service end date. The product name is the name of the software to be supported in the support contract. The customer company name is the name of the customer company which concludes the support contract. The shipping date is the shipping date of the software to be supported. The support contract specifying number is the individual identification number which uniquely specifies the concluded support contract. The service contract date is the date at which the support contract is concluded. The service start date is the date at which the support is started. The service end date is the date at which the support contract expires.

FIG. 8 is a view illustrating an example of the software installation number excess table. In the software installation number excess table 151, a record indicating an installation status of the software product is stored. The record in the software installation number excess table 151 includes the product name, the version, the customer company name, the shipped number, the number of detected installations, and an excess flag. The product name is the product name of the software the number of installations of which is to be managed. The version is the version number of the software the number of installations of which is to be managed. The customer company name is the name of the customer company 30 which is an installation destination of the software the number of installations of which is to be managed. The shipped number is the number of pieces of software the number of installations of which is to be managed shipped to the customer company 30. The number of detected installations is the number of servers in the customer company 30 on which the software the number of installations of which is to be managed is installed (number of installations). The excess flag is a flag indicating whether the number of installations does not exceed the shipped number. For example, in a case where the number of installations does not exceed the shipped number, "0" is set in the excess flag. In a case where the number of installations exceeds the shipped number, "1" is set in the excess flag.

Figure 9:
FIG. 9 is a view illustrating an example of a software contract state management table.

FIG. 9 is a view illustrating an example of the software contract state management table. In the software contract state management table 152, a record indicating the state of the support contract of the software is stored.

The record of the software contract state management table 152 includes the serial number of the server, the software shipping specifying number, the support contract specifying number, a contract specifying flag, and a contract period expiry flag. The serial number of the server is the individual identification number of the server on which the software to be managed is installed. The software shipping specifying number is the individual identification number which uniquely identifies the software to be managed. The support contract specifying number is the individual identification number which uniquely specifies the support contract applied to the software corresponding to the software shipping specifying number. The contract specifying flag is a flag indicating the presence or absence of the support contract applied to the software. For example, in a case where there is no support contract, "0" is set in the contract specifying flag. "1" is set in the contract specifying flag when a combination of the server and the support contract of the software is uniquely determined and it becomes possible to provide the support service. The contract period expiry flag is a flag indicating whether the support contract to be applied expires. For example, when the support contract does not expire, "0" is set in the contract period expiry flag. When the support contract expires, "1" is set in the contract period expiry flag.

The support contract for the software is managed by the management device 100 having the above-described configuration. The management of the support contract starts when the software is installed on any server of the customer company 30.

Figure 10:
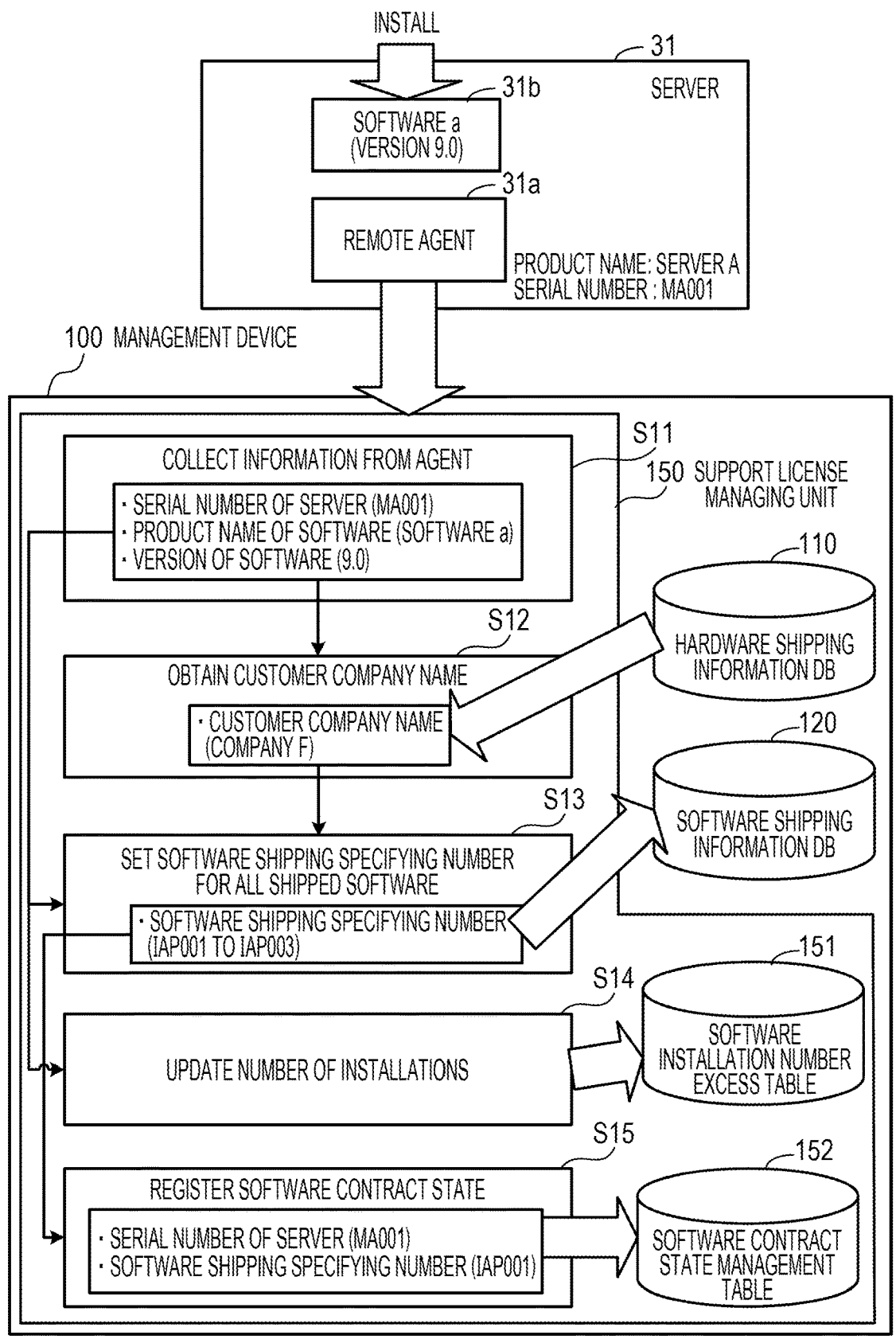
FIG. 10 is a view illustrating an example of a process at the time of software installation.

FIG. 10 is a view illustrating an example of a process at the time of software installation. In the example in FIG. 10, it is assumed that software 31b with the product name "software a" of version "9.0" is installed on the server 31 with the server name "server A" and the serial number "MA001".

The support license managing unit 150 of the management device 100 periodically collects the information from each of the servers 31 to 34 (step S11). For example, the support license managing unit 150 transmits a request to obtain the information regarding the installed software to the remote agent 31a of the server 31. Upon receiving a first request to obtain after the installation of the software 31b, the remote agent 31a transmits the installation information to the support license managing unit 150 in response to the request to obtain. The transmitted installation information includes the serial number "MA001" of the server 31, the product name "software a" of the software 31*b*, and the version "9.0" of the software 31*b*.

The support license managing unit 150 which receives the installation information searches the hardware shipping information DB 110 using the serial number of the server included in the installation information as a search key. Then, the support license managing unit 150 obtains the customer company name from the record including the search key (step S12). In a case where contents of the hardware shipping information DB 110 are as illustrated in FIG. 5, when searching with the serial number "MA001", a first record coincides. Then, the support license managing unit 150 obtains the customer company name "F company" set in the record.

Next, the support license managing unit 150 searches the software shipping information DB 120 for a record coincident with the obtained customer company name and the product name and version of the software included in the installation information. Then, the support license managing unit 150 creates serial numbers of all the corresponding records and sets the serial number as the software shipping specifying number in a corresponding record in the software shipping information DB 120 (step S13). For example, in the software shipping information DB 120 illustrated in FIG. 6, there are three records having the product name "software a", version "9.0", and customer company name "F company". In this case, the support license managing unit 150 generates, for example, "IAP001 to IAP003" as the software shipping specifying numbers for the software indicated in the three records, and sets them in the respective records.

Also, upon receiving the installation information, the support license managing unit 150 updates the number of installations of the installed software in the software installation number excess table 151 (step S14). In the example in FIG. 10, if there is no record which coincides with the product name "software a", version "9.0", and customer company name "F company" in the software installation number excess table 151, the support license managing unit 150 adds a corresponding record. An initial value of the number of detected installations when adding the record is "1". Also, when there is the record coincident with the product name "software a", version "9.0", and customer company name "F company" in the software installation number excess table 151, the support license managing unit 150 adds "1" to the number of detected installations of the corresponding record.

Furthermore, the support license managing unit 150 registers a record corresponding to a group of the serial number of the server 31 on which the software is installed and one of the software shipping specifying numbers in the software contract state management table 152 (step S15). An unused one of the software shipping specifying numbers corresponding to a group of the obtained customer company name, and the product name and version of the software is used as the software shipping specifying number of the record to be newly registered. The unused software shipping specifying number is the software shipping specifying number that is not set in another record in the software contract state management table 152. For example, the support license managing unit 150 registers the record of the server serial number "MA001" and the software shipping specifying number "IAP001" in the software contract state management table 152. Note that the contract specifying flag of the record newly added to the software contract state management table 152 is "0", and the contract period expiry flag is also "0".

When the software is installed on any of the servers of the customer company 30 in this manner, the information is collected by the management device 100 and the DB and the data table are updated. Thereafter, when the customer company 30 wishes to receive the support regarding the installed software, a support inquiry is made from the customer company to the service provider 40.

Figure 11:
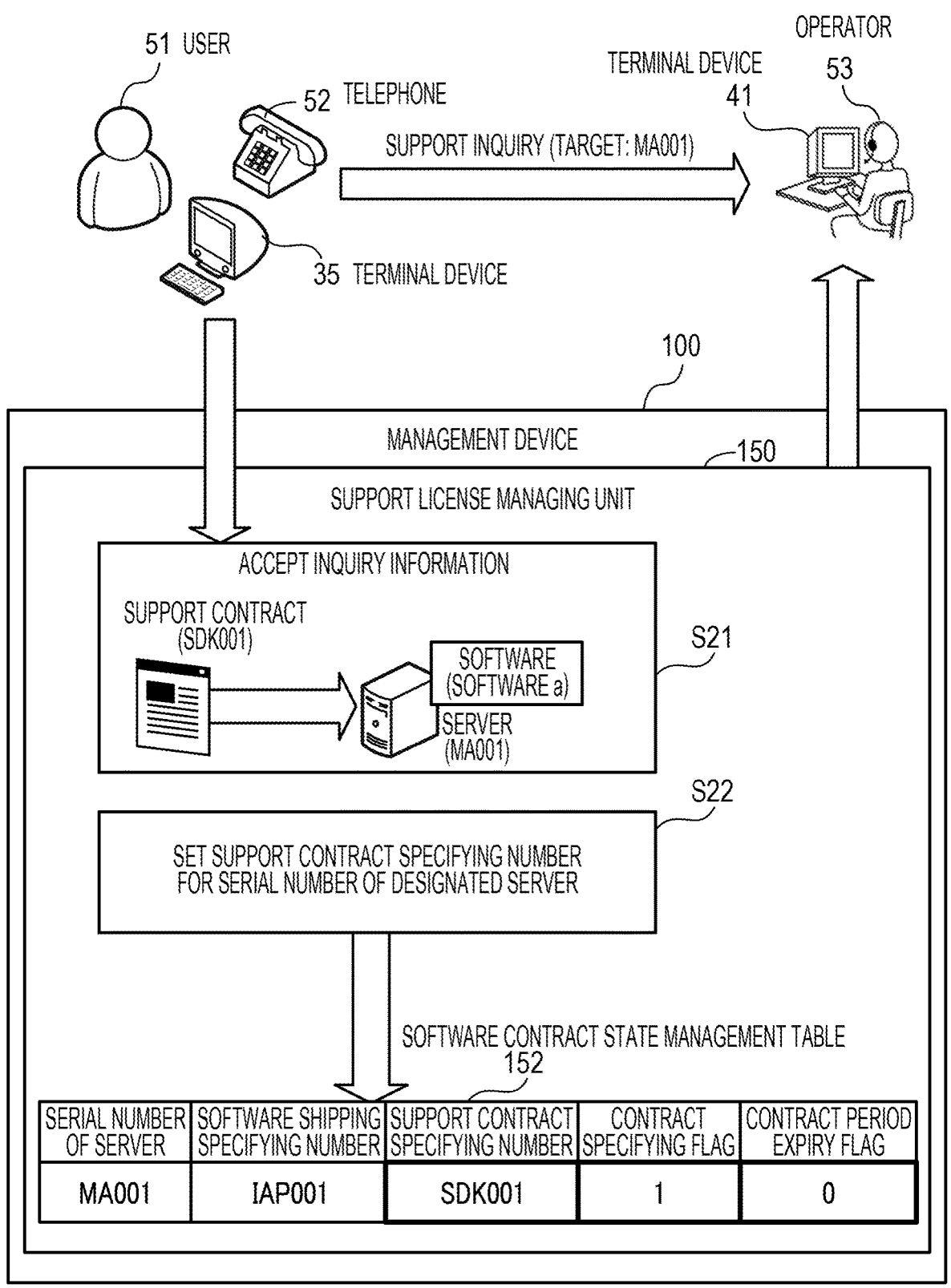
FIG. 11 is a view illustrating an example of a support inquiry process.

FIG. 11 is a view illustrating an example of a support inquiry process. When a user 51 who uses the software by using the servers 31 to 34 in the customer company 30 receives the support of the software, he/she accesses a Web page for inquiry in the management device 100 by using the terminal device 35. Then, screen data indicating an inquiry time operation screen is transmitted from the screen control unit 160 of the management device 100 to the terminal device 35. As a result, the inquiry time operation screen is displayed on the terminal device 35. The user 51 operates the inquiry time operation screen to select the support contract to be applied to the software to be supported.

FIG. 12 is a view illustrating an example of the inquiry time operation screen. For example, when the user 51 logs in to the management device 100 with an account of the customer company 30, a list of the servers sold to the customer company 30 is displayed on the terminal device 35. When the user 51 selects the server on which the software to be supported is installed from the list of the servers, an inquiry time operation screen 61 as illustrated in FIG. 12 is displayed on the terminal device 35.

The inquiry time operation screen 61 includes a device display portion 61*a*, a software display portion 61*b*, and a support contract display portion 61*c*. Information regarding the server selected by the user 51 is displayed in the device display portion 61*a*. In the software display portion 61*b*, an object corresponding to the software installed on the server illustrated in the device display portion 61*a* is displayed. In the object corresponding to the software, the product name of the corresponding software is indicated. In the support contract display portion 61*c*, an object corresponding to the support contract an application target of which is not yet determined out of the support contracts concluded by the customer company 30 is displayed. In the object corresponding to the support contract, the product name of the support contract is indicated.

The user 51 performs selecting operation of the support contract to be applied to the software on the terminal device 35. For example, the user 51 superimposes one of the objects in the support contract display portion 61*c* on the object of the software in the software display portion 61*b* by drag-and-drop. Next, the user displays a pull-down menu 61*d* in the inquiry time operation screen 61. The pull-down menu 61*d* includes a command "make inquiry". When the user 51 selects this command, inquiry information is transmitted from the terminal device 35 of the customer company 30 to the terminal device 41 of the service provider 40. The inquiry information includes the product name (software a) and version (9.0) of the software of the application target, the serial number (MA001) of the server on which the software is installed, and the support contract specifying number (SDK001) of the support contract to be applied.

By making the inquiry via the inquiry time operation screen 61 from such terminal device 35, the software out of the number of pieces of software being the target of the support contract is suppressed from being designated as the support contract target. That is, since only the object corresponding to the support contract the application target of which is not yet determined is displayed in the support contract display portion 61*c*, it is not possible to assign the support contract to the software out of the number of pieces of the software supportable by the support contract.

Hereinafter, FIG. 11 is described again.

The support license managing unit 150 of the management device 100 accepts the inquiry information from the terminal device 35 (step S21). The support license managing unit 150 which receives the inquiry information searches the software contract state management table 152 for the record corresponding to a group of the serial number of the server (MA001), the software, and the support contract specifying number (SDK001). A case where the corresponding record is present is a case where the support contract as designated by the user 51 is applied to the software being an inquiry target. In a case where the corresponding record is not present, the support license managing unit 150 sets the support contract specifying number (SDK001) indicated in the inquiry information in the record coincident with the serial number (MA001) of the server in the software contract state management table 152 (step S22). At that time, the support license managing unit 150 sets "1" in the contract specifying flag of the record in which the support contract specifying number (SDK001) is set.

Thereafter, the selected support contract is applied to the software installed on the server designated by the user 51. When the application of the support contract is determined, the screen control unit 160 updates the inquiry time operation screen 61 displayed on the terminal device 35.

FIG. 13 is a view illustrating an example of the inquiry time operation screen after the support contract is selected. When the support contract is selected, the support contract display portion 61c displays "with support contract". In such a state, the user 51 may freely inquire about the support afterwards.

For example, the user 51 calls the service provider 40 to inquire about the support by using a telephone 52 (refer to FIG. 11). Then, the user 51 notifies an operator 53 who answered the telephone of the product name (software a) of the software to be supported and the serial number (MA001) of the server on which the software is installed. Using the terminal device 41, the operator 53 inquires of the management device 100 about the presence or absence of the support contract for the corresponding software installed on the corresponding server. In a case where the terminal device 41 receives a response indicating that there is the support contract from the management device 100, the operator 53 performs the support for the inquiry from the user 51.

Note that the inquiry about the presence or absence of the support contract includes, for example, the product name and version number of the software to be supported, and the serial number of the server on which the software is installed. In the management device 100, when there is the inquiry about the presence or absence of the support contract, the support license managing unit 150 obtains the software shipping specifying number corresponding to the software to be supported from the software shipping information DB 120. Next, the support license managing unit 150 searches the software contract state management table 152 for the record corresponding to a group of the serial number of the server indicated in the inquiry about the presence or absence of the support contract and the obtained software shipping specifying number. Then, if the contract specifying flag of the record coincident in the search is "1", the support license managing unit 150 determines that there is the support contract. The support license managing unit 150 notifies the terminal device 41 of a determination result of the presence or absence of the support contract.

In this manner, even if the individual identification number is not assigned to the software before shipping, the presence or absence of the support contract of each software may be determined by the software shipping specifying number by assigning the software shipping specifying number to the shipped software.

Next, a case where the software of the same product name is installed on a plurality of servers is described.

Figure 14:
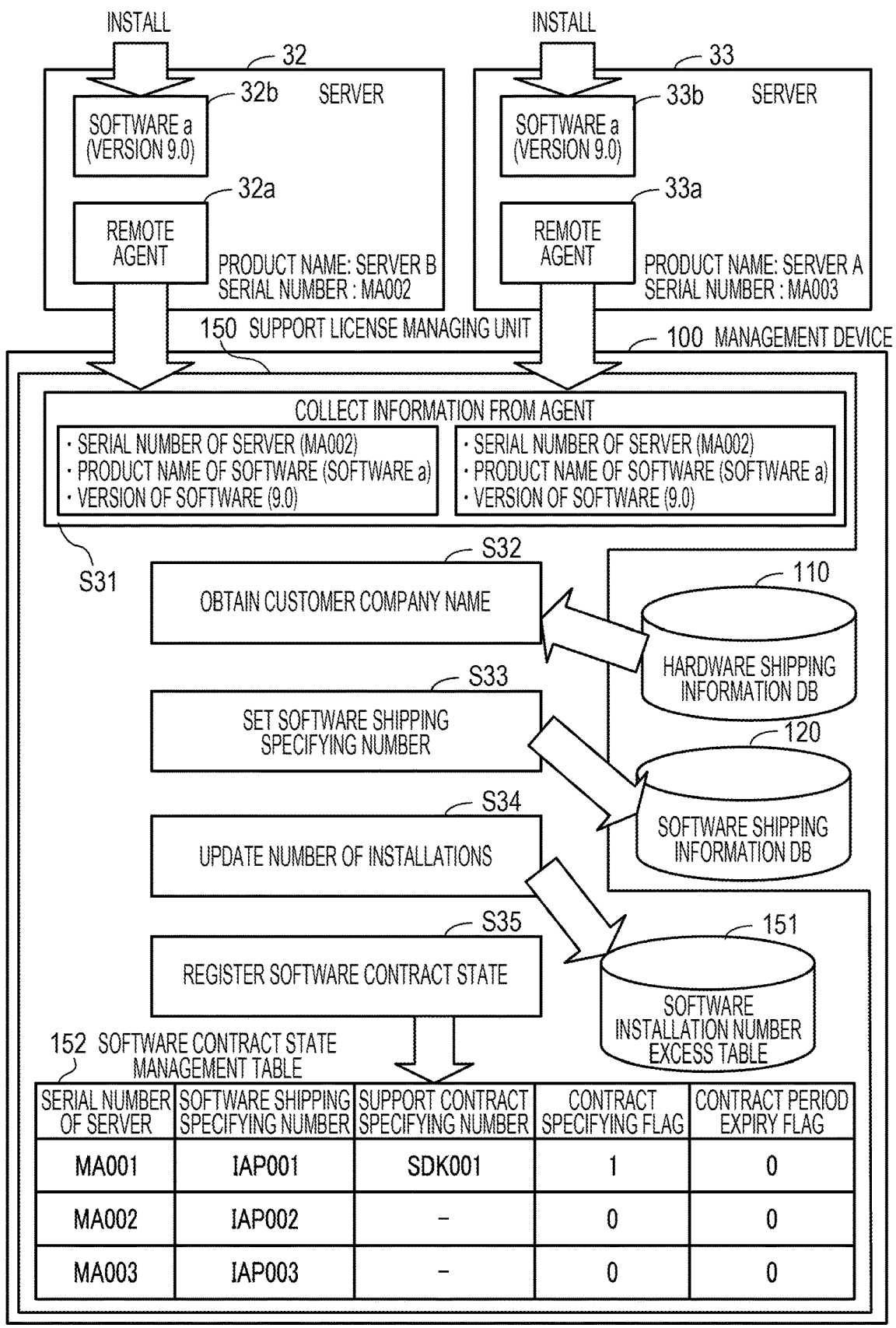
FIG. 14 is a view illustrating an example of a process at the time of installation of software on a plurality of servers.

FIG. 14 is a view illustrating an example of a process at the time of installation of the software on a plurality of servers. FIG. 14 illustrates an example of a case where pieces of software 32b and 33b having the product name "software a" and version "9.0" are installed on the servers 32 and 33, respectively.

The support license managing unit 150 of the management device 100 collects information from a remote agent 32a of the server 32 and a remote agent 33a of the server 33 and obtains installation information (step S31). Also, as in the example in FIG. 10, the support license managing unit 150 obtains the customer company name (step S32), sets the software shipping specifying number (step S33), updates the number of installations (step S34), and registers the software contract state (step S35).

As a result, in the software contract state management table 152, records corresponding to the serial numbers "MA002" and "MA003" of the server are added.

In the example in FIG. 14, in the customer company 30, the software having the product name "software a" is installed on the three servers 31 to 33. In contrast, as illustrated in FIG. 7, the support contract for the corresponding software concluded by the customer company is for two pieces of software. Consider, for example, a case where the support contract of a support contract specifying number "SDK002" is applied to the software installed on the server 32 the serial number of which is "MA002" from the state illustrated in FIG. 14. In this case, the customer company 30 has the support contract for the software having the product name "software a" installed on the servers 31 and 32, but does not have the support contract for the software having the product name "software a" installed on the server 33.

In this state, when a problem occurs in operation of the software having the product name "software a" installed on the server 33, there is a possibility that the user 51 inquires about the support while falsifying the serial number of the server in which the problem occurred. In a case of such invalid support inquiry, the management device 100 detects that the inquiry is invalid and notifies the operator 53 that, for example, this is the invalid inquiry.

Figure 15:
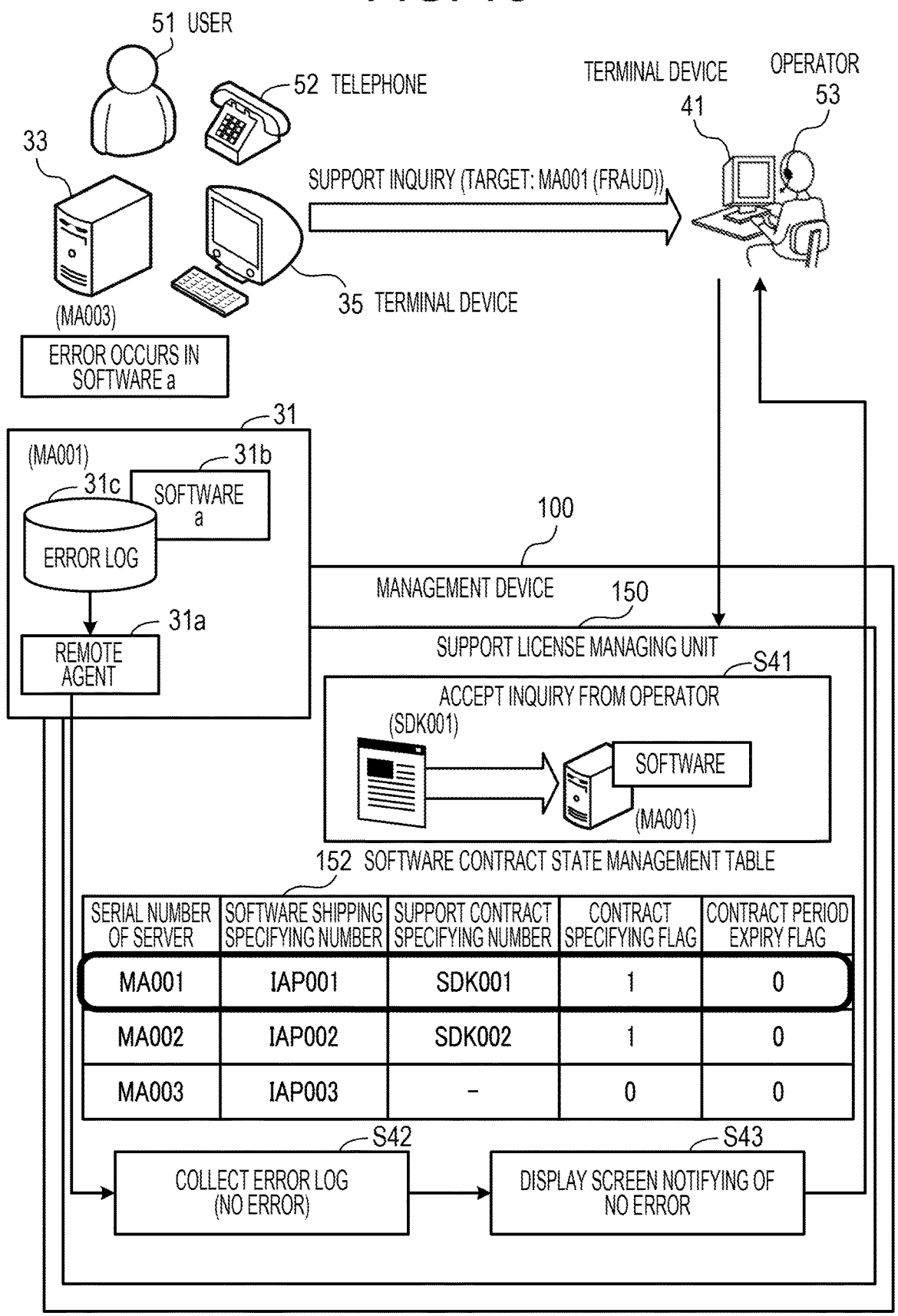
FIG. 15 is a view illustrating an example of a process for an invalid support inquiry.

FIG. 15 is a view illustrating an example of a process for the invalid support inquiry. In the example in FIG. 15, an error occurs in the software installed on the server 33 of the serial number "MA003". However, there is no support contract for this software. It is assumed that the user 51 pretends that an error occurs in the software 31b installed on the server 31 of the serial number "MA001" and makes a telephone inquiry to the call center at that time.

In this case, the operator 53 of the call center makes an inquiry about the presence or absence of the support contract for the software having the product name "software a" installed on the server 31 of the serial number "MA001" by using the terminal device 41 in response to the telephone inquiry. For example, the operator 53 accesses the management device 100 by the terminal device 41 and allows to display the inquiry time operation screen similar to that in FIG. 13. Then, the operator 53 performs the inquiry operation of the product name "software a" installed on the server 31 of the serial number "MA001" declared by the user 51 by telephone on the terminal device 41.

In the management device 100, the support license managing unit 150 accepts the inquiry from the operator 53 using the terminal device 41 (step S41). The support license managing unit 150 refers to the software contract state management table 152. Then, the support license managing unit 150 recognizes that there is the support contract with the support contract specifying number "SDK001" for the software (software specifying number "IAP001") in the server 31 of the serial number "MA001".

Therefore, the support license managing unit 150 collects the error log from the server 31 with the serial number "MA001" (step S42). For example, the support license managing unit 150 requests the remote agent 31a in the server 31 to issue an error log 31c of the software 31b. The remote agent 31a transmits the error log 31c to the support license managing unit 150. In the example in FIG. 15, the error occurs not in the server 31 but in the server 33, so that the occurrence of the error is not recorded in the transmitted error log 31c.

On the basis of the obtained error log 31c, the support license managing unit 150 recognizes that no error occurs in the server 31. Then, the support license managing unit 150 displays a message indicating that no error occurs on the inquiry time operation screen of the terminal device 41 (step S43).

Figure 16:
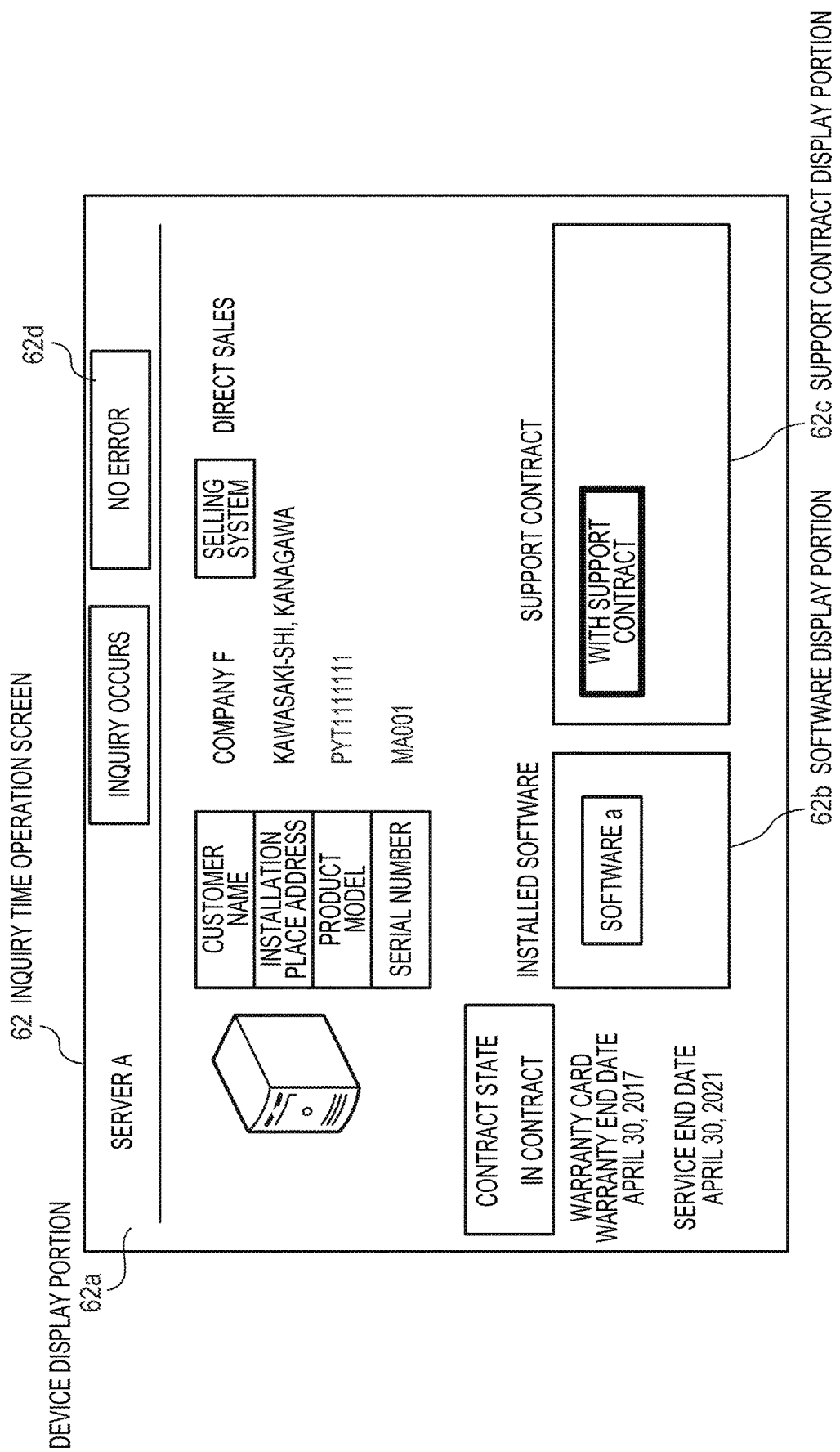
FIG. 16 is a view illustrating an example of the inquiry time operation screen in a case where no error occurs.

FIG. 16 is a view illustrating an example of the inquiry time operation screen in a case where no error occurs. The inquiry time operation screen 62 of the terminal device 41 includes a device display portion 62a, a software display portion 62b, and a support contract display portion 62c as in the inquiry time operation screen 61 illustrated in FIG. 13. On the inquiry time operation screen 62, a message 62d "no error occurs" is displayed.

The operator 53 checks the inquiry time operation screen 62 and recognizes that the user 51 falsifies the software of the inquiry target. That is, fraud of the user 51 may be detected. In a case where the inquiry of the user 51 is invalid, the operator 53 refuses the support for the inquiry. At that time, the operator 53 may prompt the user 51 to purchase an additional support contract.

Note that, in the above-described example, since the user 51 makes an inquiry by telephone, the message 62d "no error occurs" is displayed on the terminal device 41 used by the operator 53. In contrast, it is also possible for the user 51 to make an inquiry on line using the terminal device 35. In the online inquiry, in a case where the user 51 falsifies the software in which the error occurs, the inquiry time operation screen similar to that in FIG. 16 is displayed on the terminal device 35.

In this manner, it is possible to collect the error logs from the server in accordance with a declared content of the user 51 and to confirm whether the corresponding error occurs. As a result, a fraudulent act by the user 51 may be detected.

There also is an act of installing the software on devices more than the number sold as the fraudulent act performed by the customer company 30. For example, in the software shipping information DB 120 illustrated in FIG. 6, it is indicated that three pieces of software having the product name "software a" are sold to the customer company 30. In this case, the customer company 30 does not have a right to install this software on four or more servers. However, in the customer company 30, the software might be installed on the servers more than the number of pieces of purchased software. The management device 100 may also suppress such excessive installation of the software.

Figure 17:
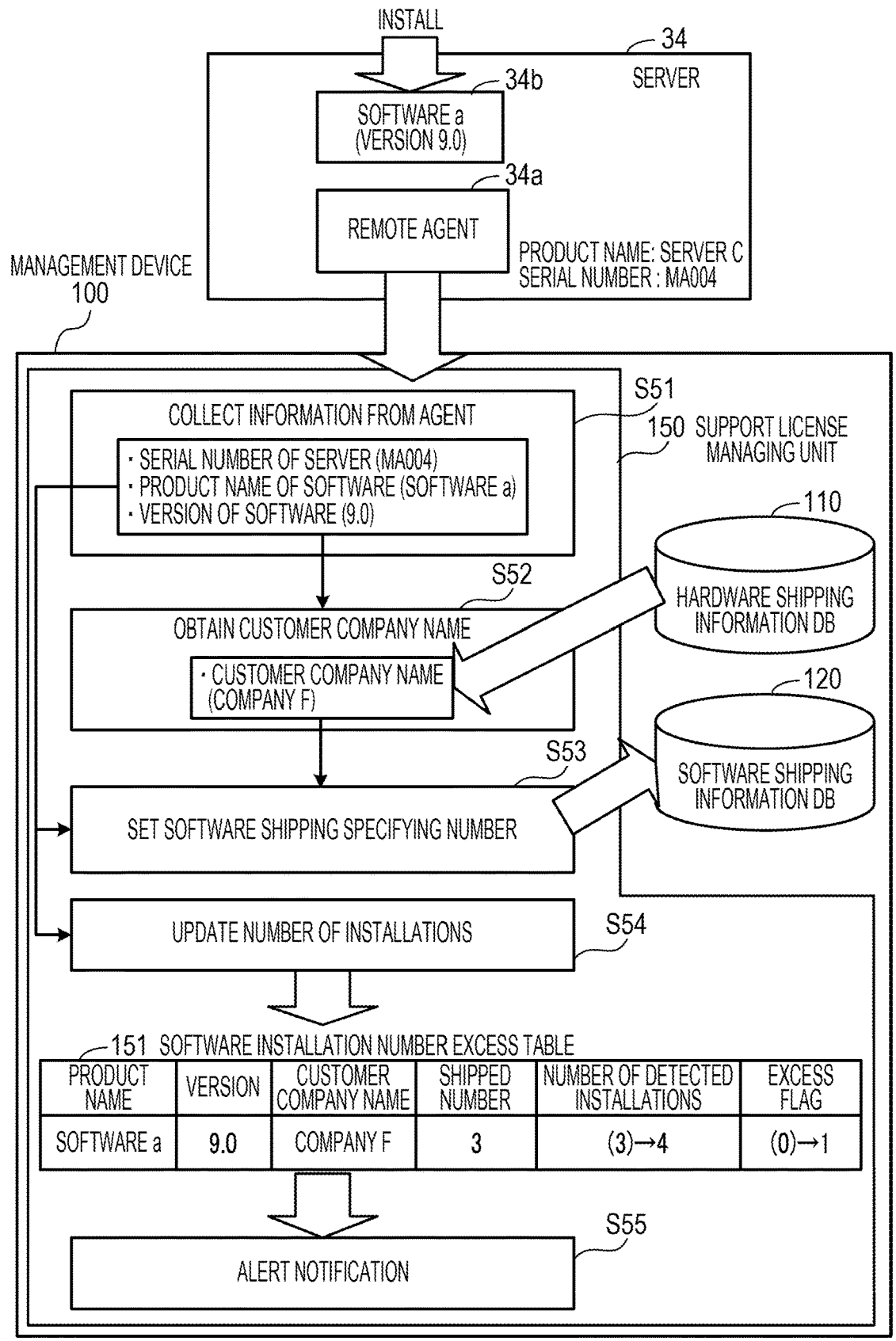
FIG. 17 is a view illustrating an example of a software installation number excess suppressing process.

FIG. 17 is a view illustrating an example of a software installation number excess suppressing process. The example in FIG. 17 is a case where, when the software having the product name "software a" is already installed on the three servers 31 to 33, the same software 34b is installed on the fourth server 34.

The support license managing unit 150 of the management device 100 collects information from a remote agent 34a of the server 34 and obtains the installation information indicating that the software 34b is installed (step S51). Thereafter, the support license managing unit 150 obtains the customer company name (step S52), sets the software shipping specifying number (step S53), and updates the number of installations (step S54).

When updating the number of installations, one is added to the number of detected installations of the record corresponding to the product name "software a", version "9.0", and customer company name "F company" in the software installation number excess table 151. In the example in FIG. 17, the number of detected installations is updated to "4". At that time, the support license managing unit 150 compares the number of detected installations after updating with the shipped number of the same record, and in a case where the shipped number is smaller, sets "1" in the excess flag of the record.

In a case where "1" is set in the excess flag, the support license managing unit 150 notifies the terminal device 35 of the customer company 30 or the terminal device 41 of the call center of an alert (step S55). For example, the support license managing unit 150 inserts alert notification into the screen data of the inquiry time operation screen to be transmitted in a case where there is the access from the terminal device 35. As a result, when the user 51 accesses the management device 100 using the terminal device 35, it is possible to display the alert on the terminal device 35.

Figure 18:
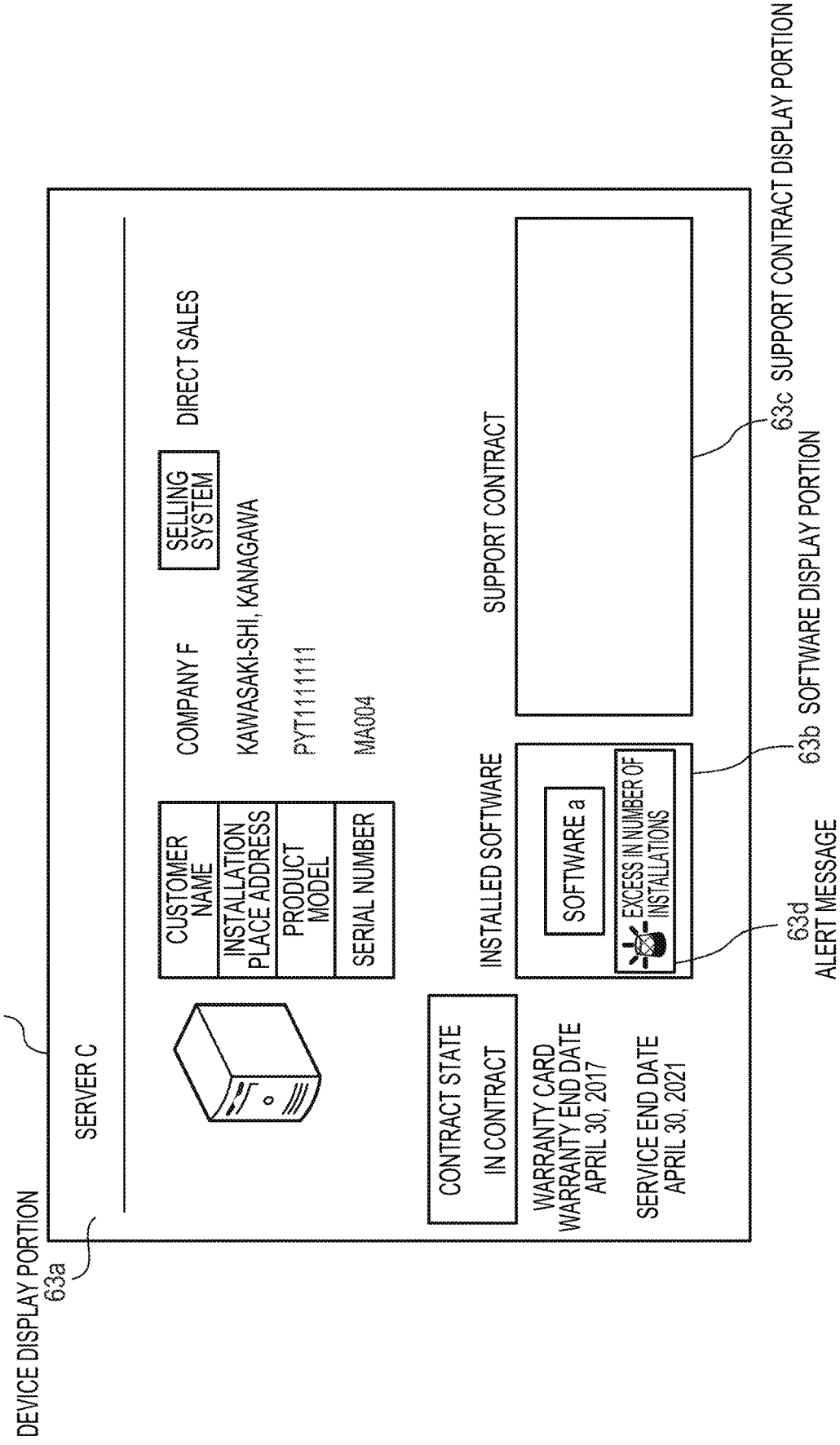
FIG. 18 is a view illustrating an example of the inquiry time operation screen on which an alert of excess in number of installations is displayed.

FIG. 18 is a view illustrating an example of the inquiry time operation screen on which an alert of excess in number of installations is displayed. It is assumed that the user 51 accesses the management device 100 using the terminal device 35 and displays the inquiry time operation screen 63 regarding the server 34 having the serial number "MA004". The inquiry time operation screen 63 includes a device display portion 63a, a software display portion 63b, and a support contract display portion 63c. In the software display portion 63b, an alert message 63d indicating excess in number of installations is displayed.

By displaying such alert message 63d, it is possible to prompt purchase of additional software.

Next, a process in a case where the software is uninstalled is described. In the second embodiment, in a case where the software is the application target of the support contract, it is managed such that the support contract is effective even if the software is uninstalled from the server and installed on another server.

Figure 19:
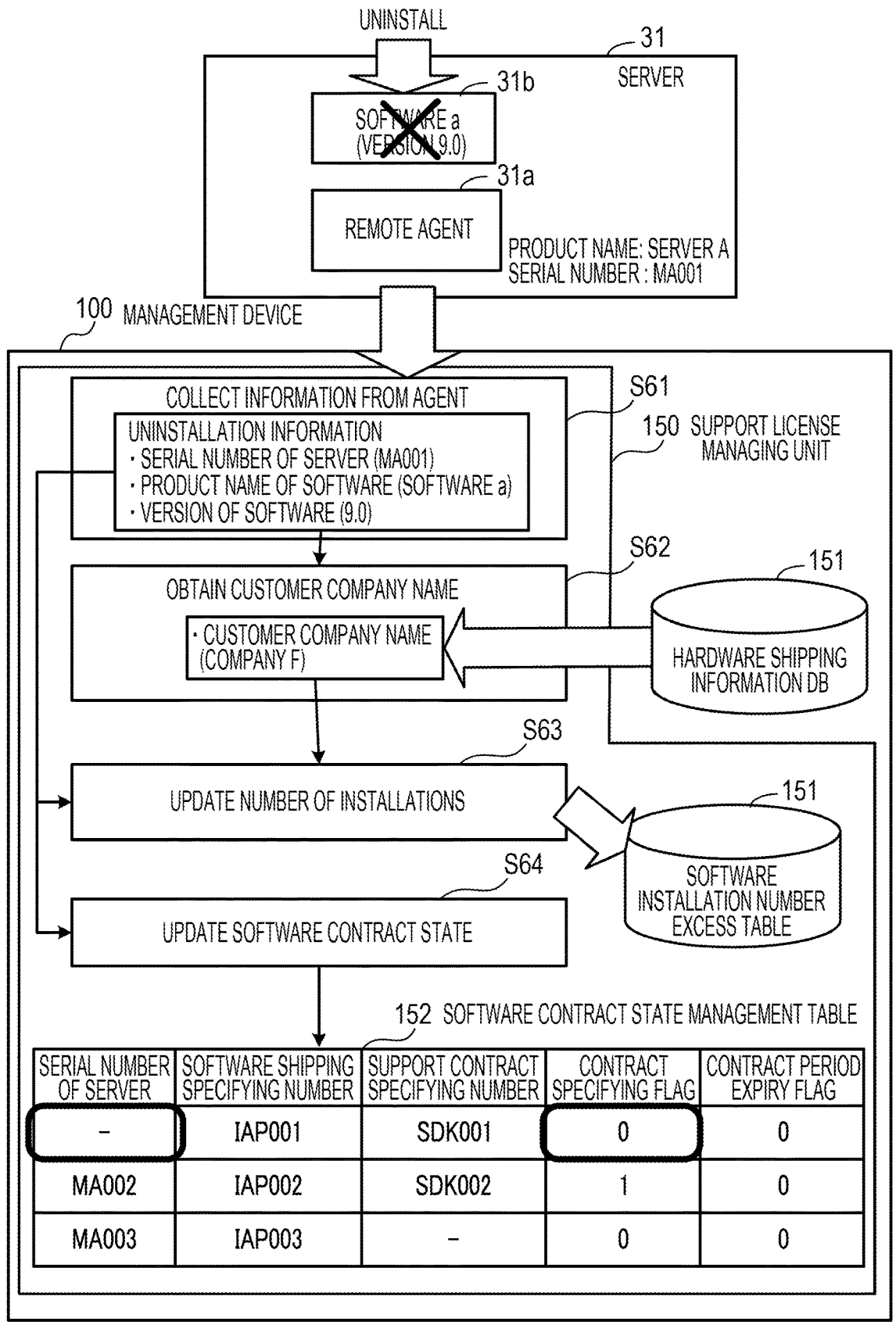
FIG. 19 is a view illustrating an example of a process at the time of uninstallation of the software.

FIG. 19 is a view illustrating an example of a process at the time of uninstallation of the software. In the example in FIG. 19, a process when the software of the server 31 is uninstalled in a state in which the software having the product name "software a" is installed on the three servers 31 to 33. Note that the support contract is applied to the software installed on the server 31 and the server 32.

The support license managing unit 150 of the management device 100 collects information from the remote agent 31a of the server 31 and obtains installation information indicating that the software 31b is uninstalled (step S61). For example, the remote agent 31a of the server 31 stores the product name and version of the software the installation of which was detected in the past as installed software information. In a case where the presence of the software indicated in the installed software information is no longer detected, the remote agent 31a transmits the uninstallation information of the software to the support license managing unit 150. The uninstallation information includes the serial number "MA001" of the server 31, the product name "software a" of the software, and the version "9.0" of the software, for example.

The support license managing unit 150 which obtains the uninstallation information obtains the customer company name (step S62) and updates the number of installations (step S63). Furthermore, the support license managing unit 150 updates the software contract state set in the software contract state management table 152 (step S64). For example, the support license managing unit 150 deletes the serial number of the server 31 from the record in which the serial number "MA001" of the server 31 indicated in the uninstallation information is set in the software contract state management table 152. The support license managing unit 150 also initializes the contract specifying flag of the record from which the serial number of the server 31 is deleted to "0".

In this manner, in the software contract state management table 152, the record in which the software shipping specifying information "IAP001" of the uninstalled software is associated with the support contract specifying number "SDK001" is left undeleted. When the software having the product name "software a" is reinstalled on another server in this state, the support contract indicated by the support contract specifying number "SDK001" is effectively applied to the reinstalled software.

Figure 20:
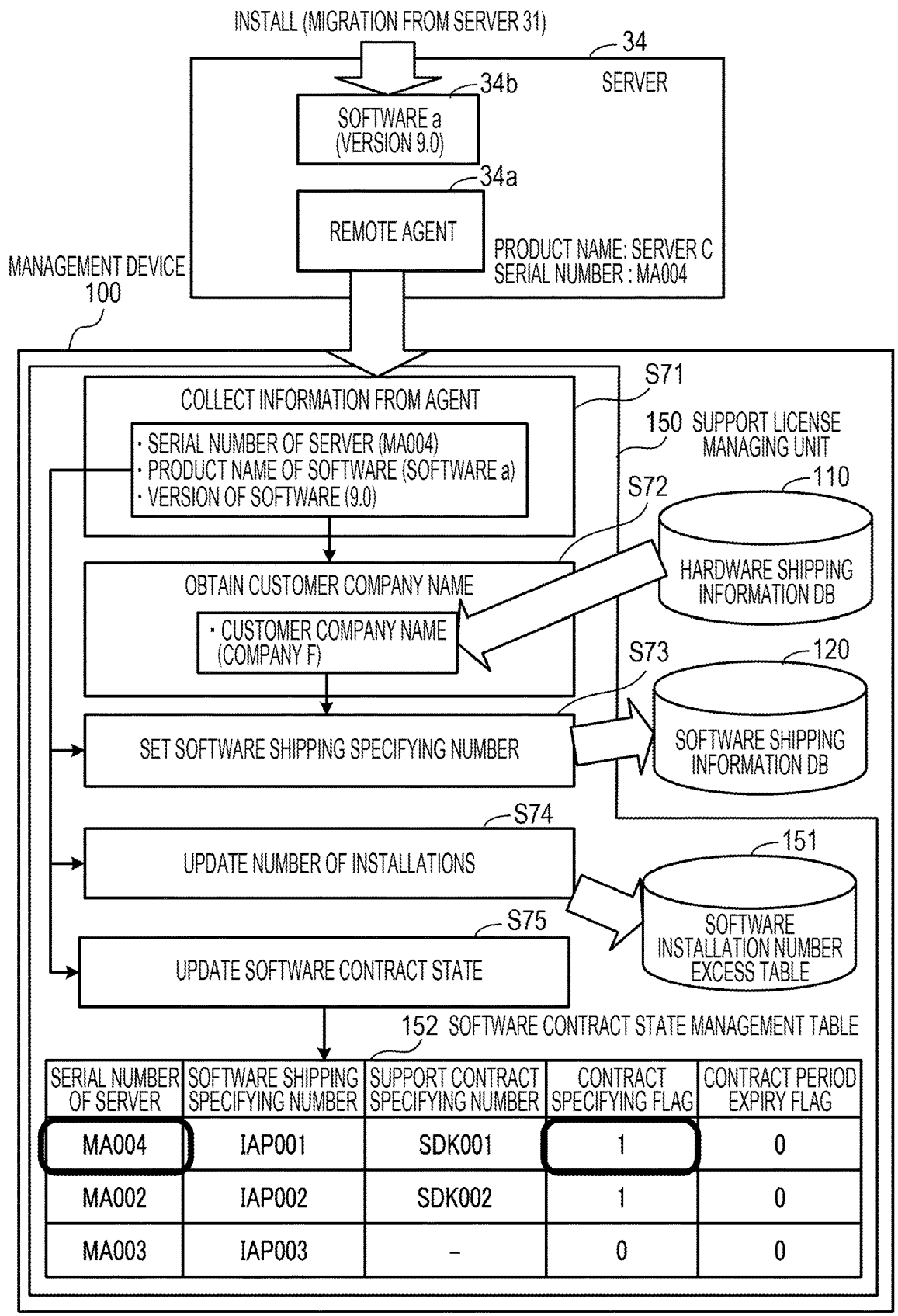
FIG. 20 is a view illustrating an example of a process at the time of reinstallation of the software.

FIG. 20 is a view illustrating an example of a process at the time of reinstallation of the software. In the example in FIG. 20, it is assumed that software 34b with the product name "software a" of version "9.0" is installed on the server 34 with the server name "server C" and the serial number "MA004".

The support license managing unit 150 of the management device 100 collects the information from the remote agent 34a of the server 34 and obtains the installation information (step S71). Then, as in the example in FIG. 10, the support license managing unit 150 obtains the customer company name (step S72), sets the software shipping specifying number (step S73), and updates the number of installations (step S74).

Furthermore, the support license managing unit 150 updates the software contract state in the software contract state management table 152 (step S75). For example, the support license managing unit 150 searches the software contract state management table 152 for the record in which the serial number of the server is not registered. Then, the support license managing unit 150 sets the serial number "MA004" of the server obtained at step S71 as the serial number of the server of the corresponding record. The support license managing unit 150 also sets "1" in the contract specifying flag of the record in which the serial number of the server is set.

In this manner, even when the server in which the software which is the target of the support contract is executed is changed, the support contract for the software may be continued.

Note that an expiration date is specified in the support contract. In the second embodiment, the management device 100 manages the expiration date of each support contract and invalidates the expired support contract.

Figure 21:
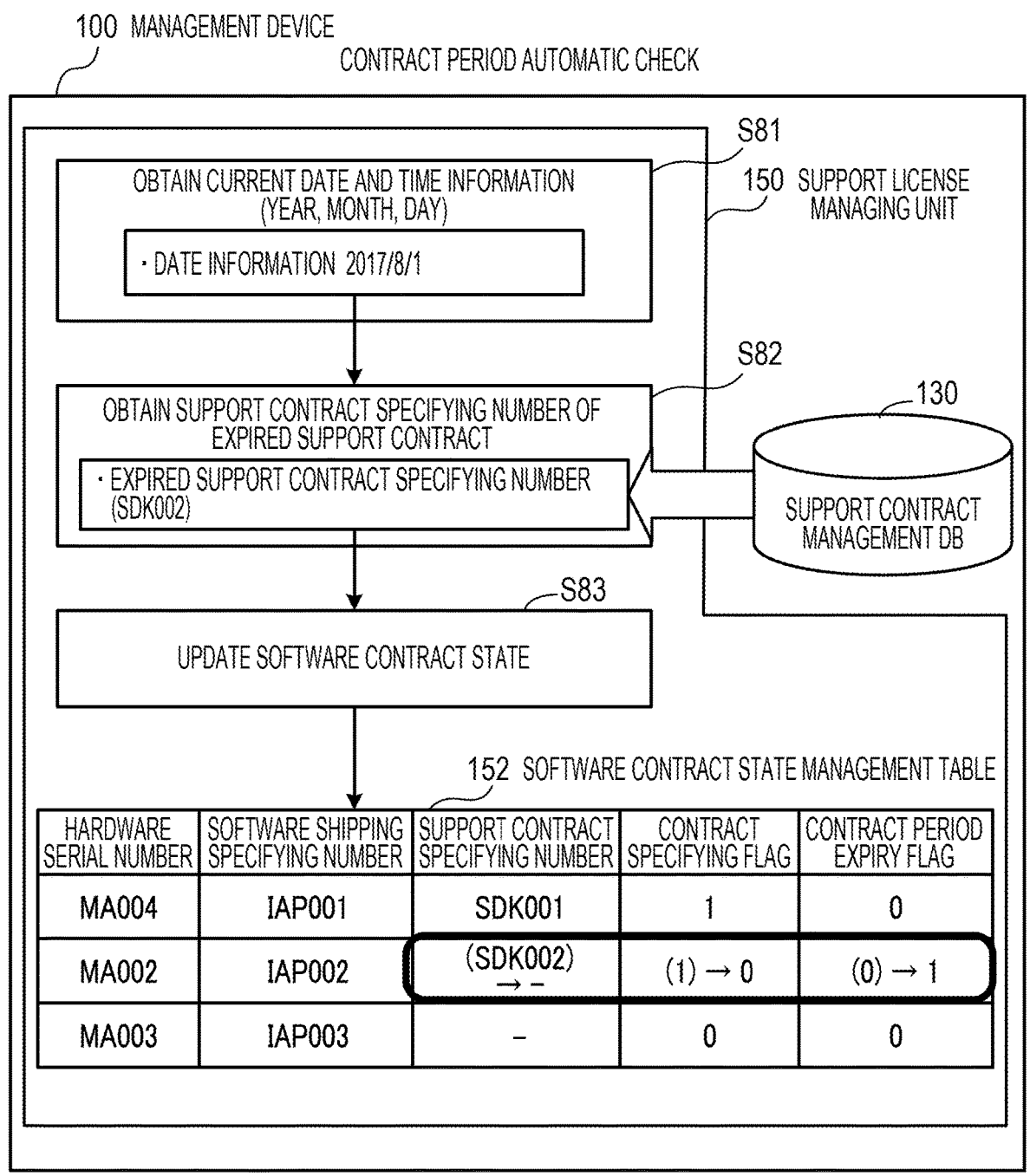
FIG. 21 is a view illustrating an example of a contract period automatic checking process.

FIG. 21 is a view illustrating an example of a contract period automatic checking process. Note that the process illustrated in FIG. 21 is periodically executed.

The support license managing unit 150 obtains current date and time information (step S81). For example, the support license managing unit 150 obtains the date and time information from a clock function in the management device 100. Also, the support license managing unit 150 may access a network time protocol (NTP) server via the network 20 to obtain accurate date and time information.

Next, the support license managing unit 150 obtains a support contract specifying number of an expired support contract from the support contract management DB 130 (step S82). For example, the support license managing unit 150 compares a service end date of each record in the support contract management DB 130 with the date of the current date and time. Then, the support license managing unit 150 extracts the support contract specifying number of the record the service end date of which is before the date of the current date and time from the support contract management DB 130. In the example in FIG. 21, the support contract specifying number "SDK002" is obtained.

Then, the support license managing unit 150 updates the software contract state indicated in the record corresponding to the extracted support contract specifying number in the software contract state management table 152 (step S83). For example, the support license managing unit 150 deletes the support contract specifying number from the record including the extracted support contract specifying number. Also, the support license managing unit 150 sets "0" in the contract specifying flag of the record and sets "1" in the contract period expiry flag.

In this manner, in the management device 100, for the software the support contract period of which expires, the contract period expiry flag "1" is set. Thereafter, when the user 51 of the customer company 30 tries to inquire about the software the support contract period of which expires via the terminal device 35, a message indicating that the support contract expires is displayed on the inquiry time operation screen.

Figure 22:
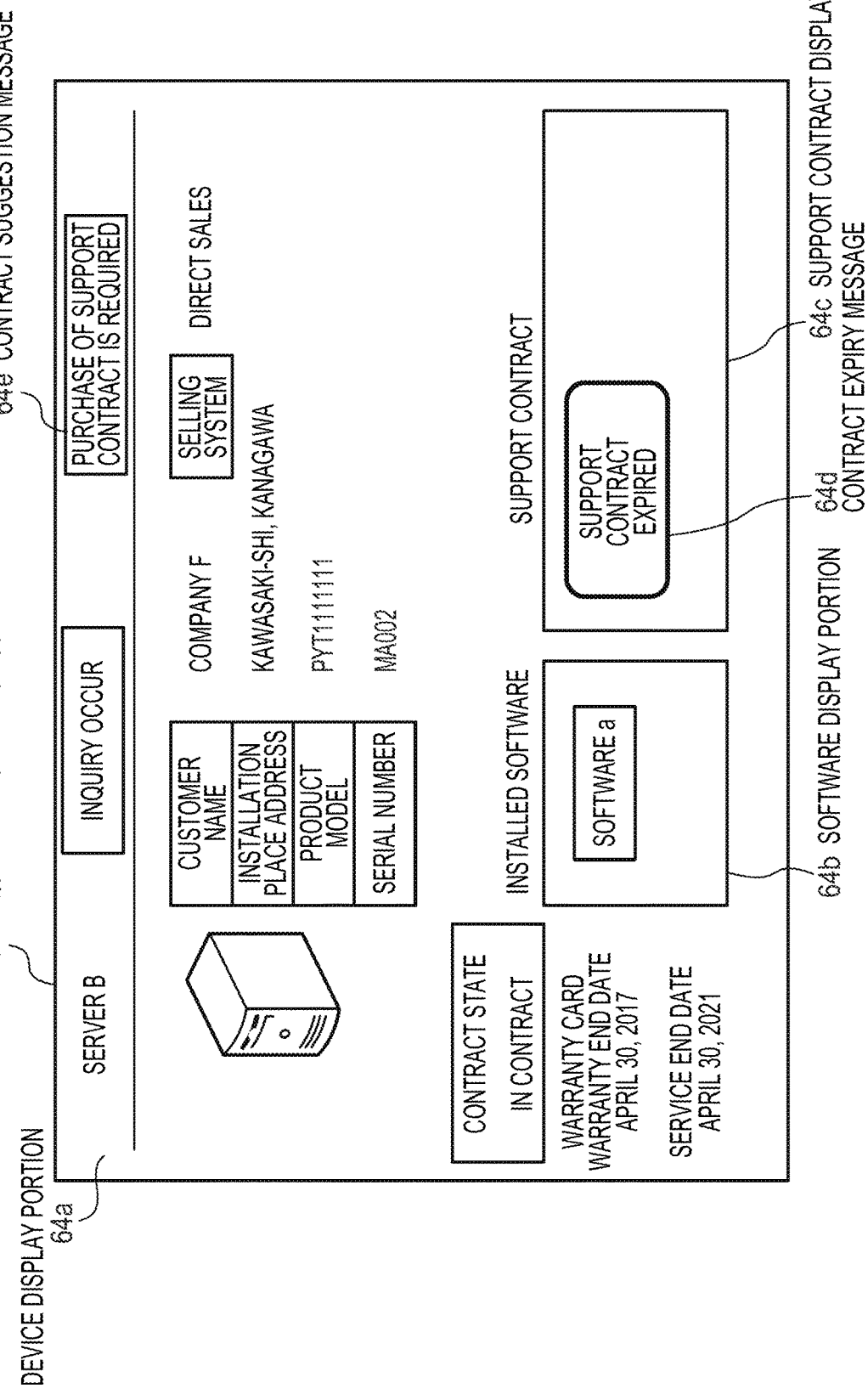
FIG. 22 is a view illustrating an example of the inquiry time operation screen in a case where the support contract expires.

FIG. 22 is a view illustrating an example of the inquiry time operation screen in a case where the support contract expires. An inquiry time operation screen 64 includes a device display portion 64a, a software display portion 64b, and a support contract display portion 64c. In the support contract display portion 64c, a contract expiry message 64d indicating that the support contract expires is displayed. Also, a contract suggestion message 64e for prompting conclusion of a new support contract is displayed on an upper portion of the inquiry time operation screen 64.

By displaying such screen, it is possible to prompt the customer company 30 to conclude a new support contract.

Hereinafter, a detailed procedure of the process executed by the management device 100 is described with reference to a flowchart.

Figure 23:
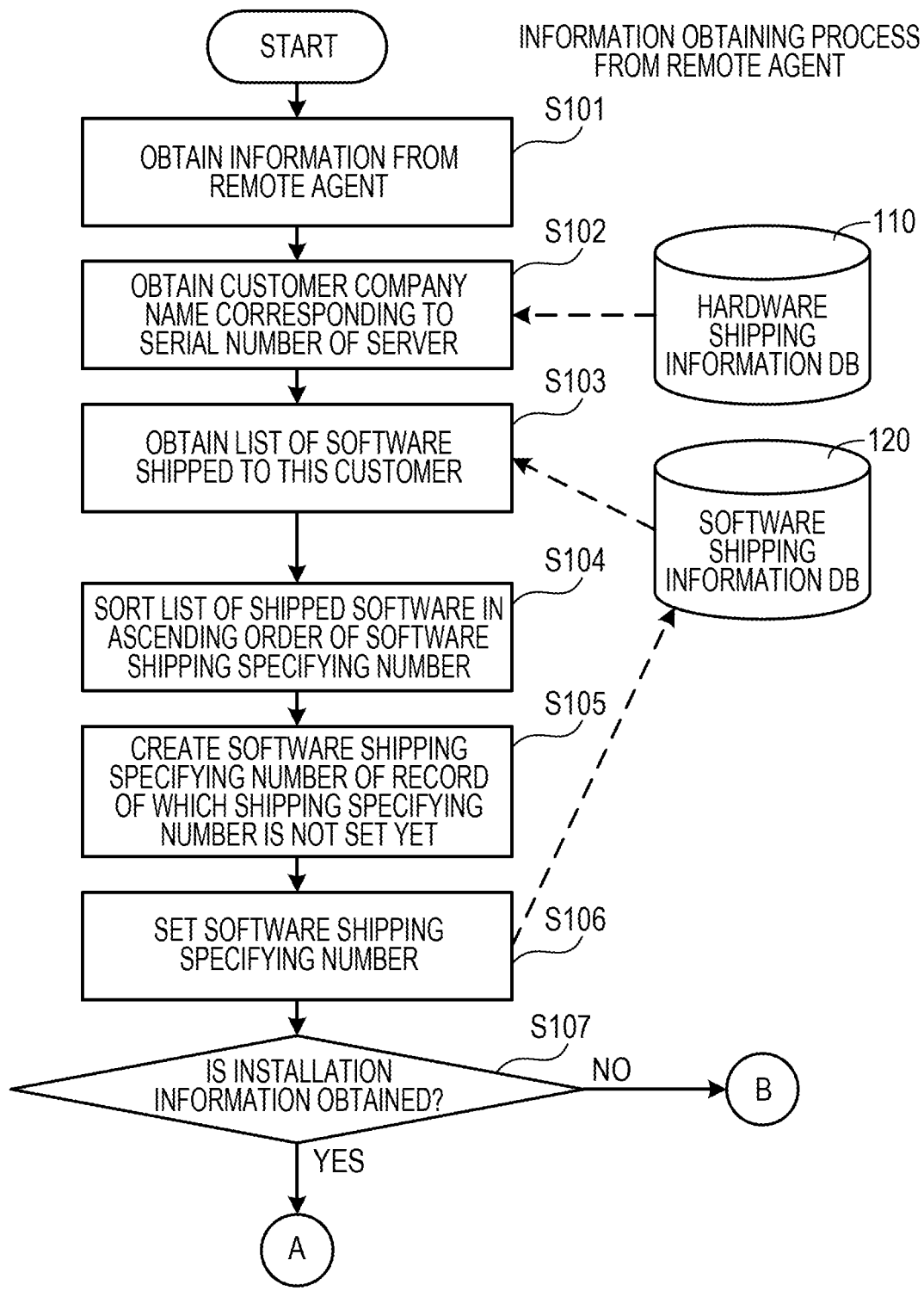
FIG. 23 is a flowchart (1/3) illustrating an example of a procedure of an information obtaining process from a remote agent.

FIG. 23 is a flowchart (1/3) illustrating an example of a procedure of an information obtaining process from the remote agent. Hereinafter, the process illustrated in FIG. 23 is described along step numbers.

[Step S101] The support license managing unit 150 obtains the information from the remote agents in the servers 31 to 34 of the customer company 30. The obtained information is the installation information indicating that the software is installed, or the uninstallation information indicating that the software is uninstalled. The obtained information includes the serial number of the server, the product name of the software, the version of the software, and a type of installation/uninstallation of the software.

[Step S102] The support license managing unit 150 obtains the customer company name corresponding to the serial number of the server included in the information obtained from the remote agent from the hardware shipping information DB 110. For example, the support license managing unit 150 searches the hardware shipping information DB 110 for the record including the serial number of the server included in the obtained information. The support license managing unit 150 obtains the customer company name from the corresponding record.

[Step S103] The support license managing unit 150 obtains a list of software shipped to the customer company 30 from the software shipping information DB 120. For example, the support license managing unit 150 searches the software shipping information DB 120 for the record including the product name of the software and the version of the software obtained at step S101 and the customer company name obtained at step S102. Then, the support license managing unit 150 obtains the product name, version, product code, and software shipping specifying number included in each corresponding record. There also is the record in which the software shipping specifying number is not set.

[Step S104] The support license managing unit 150 sorts the list of software obtained at step S103 in ascending order of the software shipping specifying numbers.

[Step S105] The support license managing unit 150 creates the software shipping specifying number that is the serial number in ascending order of the software for the software the software shipping specifying number of which is not yet set.

[Step S106] The support license managing unit 150 sets the software shipping specifying number created at step S105 in the record the software shipping specifying number of which is not yet set in the software shipping information DB 120.

[Step S107] The support license managing unit 150 determines whether the information obtained from the remote agent is the installation information. In a case where the installation information is obtained, the support license managing unit 150 shifts the procedure to step S111 (refer to FIG. 24). In a case where the uninstallation information is obtained, the support license managing unit 150 shifts the procedure to step S121 (refer to FIG. 25).

Figure 24:
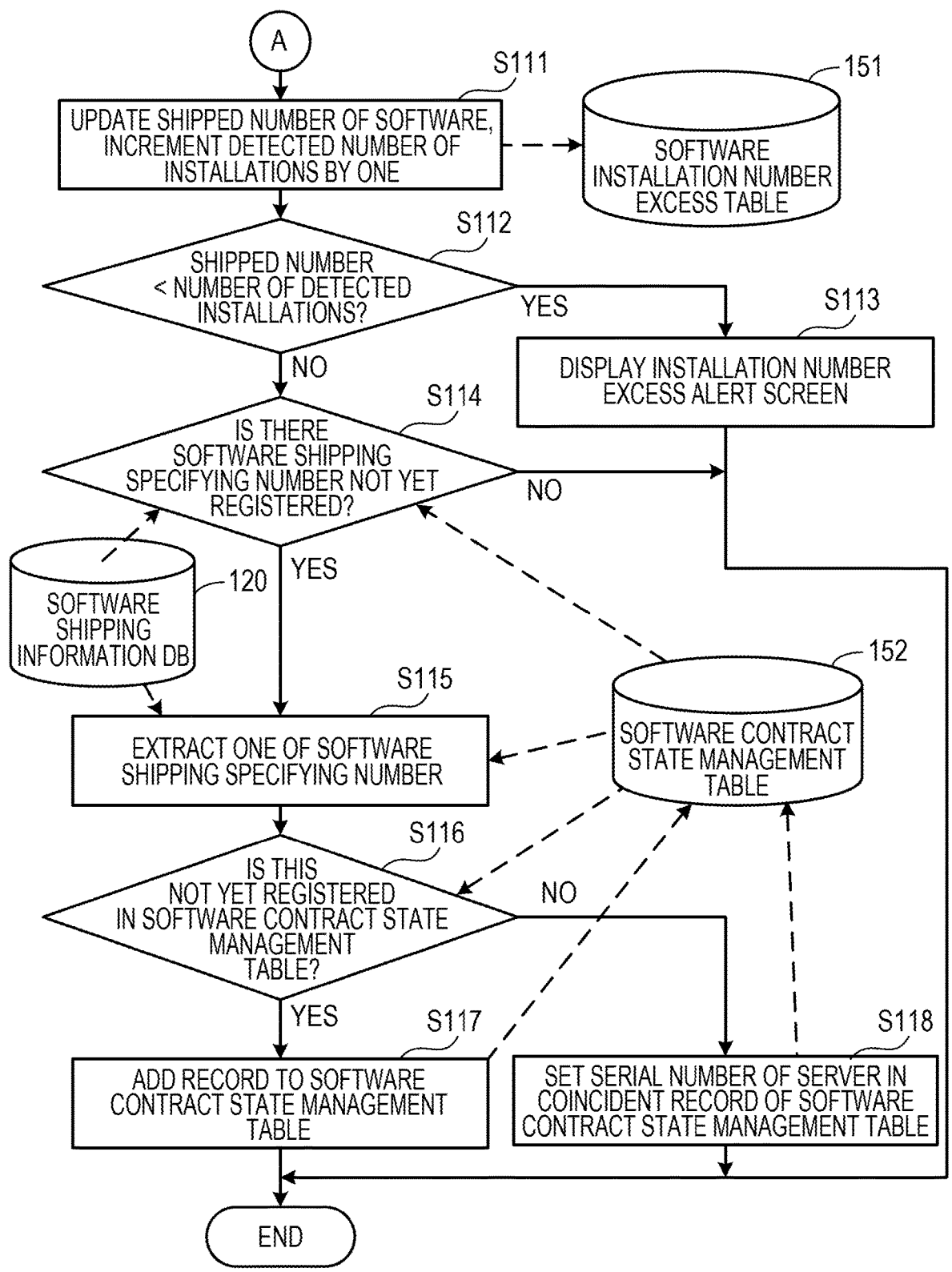
FIG. 24 is a flowchart (2/3) illustrating an example of the procedure of the information obtaining process from the remote agent.

FIG. 24 is a flowchart (2/3) illustrating an example of a procedure of an information obtaining process from the remote agent. Hereinafter, the process illustrated in FIG. 24 is described along the step number.

[Step S111] The support license managing unit 150 updates the shipped number of installed software in the software installation number excess table 151 to a latest value and adds one to the number of detected installations of the installed software. The latest value of the shipped number of the software is the number of records of the same product name and the same version as those of the installed software in the software shipping information DB 120.

[Step S112] The support license managing unit 150 determines whether the shipped number of the installed software is smaller than the number of detected installations of the software. If the shipped number of the software is smaller than the number of detected installations, the support license managing unit 150 shifts the procedure to step S113. If the shipped number of the software is not smaller than the number of detected installations, the support license managing unit 150 shifts the procedure to step S114.

[Step S113] The support license managing unit 150 allows the terminal device 35 of the customer company 30 to display the inquiry time operation screen (refer to FIG. 18) including the alert indicating the excess in number of installations. Thereafter, the support license managing unit 150 finishes the procedure.

[Step S114] The support license managing unit 150 determines whether there is the software shipping specifying number not yet registered in the software contract state management table 152 among the software shipping specifying numbers of the same product name and version as those of the installed software. In a case where there is an unregistered software shipping specifying number, the support license managing unit 150 shifts the procedure to step S115. In addition, if all the software shipping specifying numbers are already registered, the support license managing unit 150 finishes the procedure.

[Step S115] The support license managing unit 150 extracts one of the software shipping specifying numbers which are not associated with the serial number of the server in the software contract state management table 152 from the software shipping information DB 120.

[Step S116] The support license managing unit 150 determines whether the extracted software shipping specifying number is not yet registered in the software contract state management table 152. If this is not yet registered, the support license managing unit 150 shifts the procedure to step S117. Also if this is already registered, the support license managing unit 150 shifts the procedure to step S118. A case where the extracted software shipping specifying number is already registered is a case where the software is uninstalled (refer to FIG. 19).

[Step S117] The support license managing unit 150 adds the record to the software contract state management table 152. In the added record, the serial number of the server indicated in the obtained installation information, the software shipping specifying number extracted at step S115, and the contract specifying flag "0" are set. Thereafter, the procedure ends.

[Step S118] The support license managing unit 150 sets the serial number of the server indicated in the obtained installation information for the record in which the software shipping specifying number extracted at step S115 is set in the software contract state management table 152. Thereafter, the procedure ends.

Figure 25:
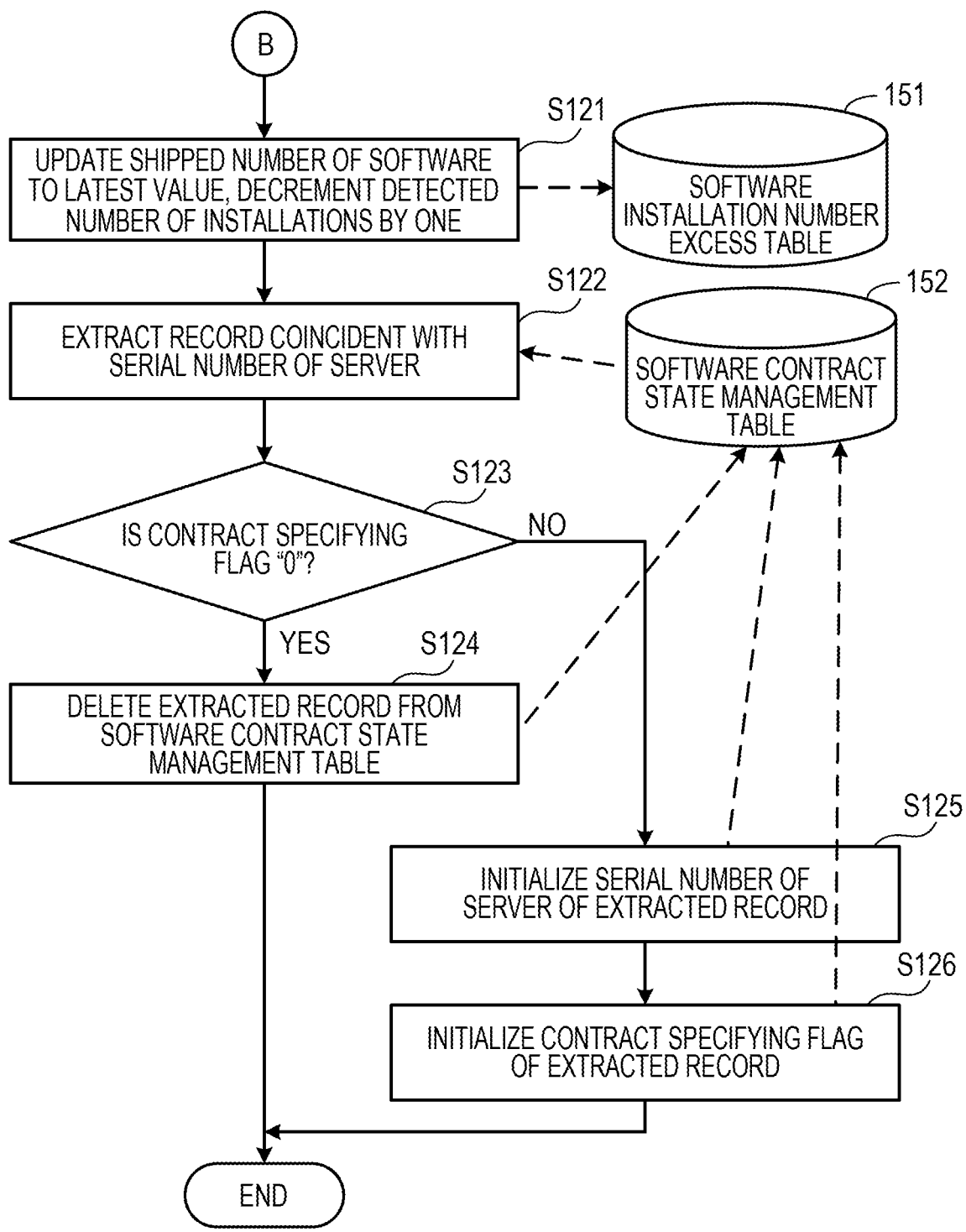
FIG. 25 is a flowchart (3/3) illustrating an example of the procedure of the information obtaining process from the remote agent.

FIG. 25 is a flowchart (3/3) illustrating an example of a procedure of an information obtaining process from the remote agent. Hereinafter, the process illustrated in FIG. 25 is described along step numbers.

[Step S121] The support license managing unit 150 updates the shipped number of the installed software in the software installation number excess table 151 to a latest value and subtracts one from the number of detected installations of the installed software.

[Step S122] The support license managing unit 150 extracts the record coincident with the serial number of the server indicated in the uninstallation information from the software contract state management table 152.

[Step S123] The support license managing unit 150 determines whether the contract specifying flag of the extracted record is "0". If the contract specifying flag is "0", the support license managing unit 150 shifts the procedure to step S124. Also, if the contract specifying flag is "1", the support license managing unit 150 shifts the procedure to step S125.

[Step S124] The support license managing unit 150 deletes the extracted record from the software contract state management table 152. Thereafter, the procedure ends.

[Step S125] The support license managing unit 150 initializes the serial number of the server of the extracted record in the software contract state management table 152 to "-".

[Step S126] The support license managing unit 150 initializes the contract specifying flag of the extracted record in the software contract state management table 152 to "0". Thereafter, the procedure ends.

As illustrated in FIGS. 23 to 25, in a case where the software is installed, the serial number of the server on which this is installed is set in the software contract state management table 152 in association with the software shipping specifying number of the software (refer to FIGS. 10 and 20). Also, in a case where the software to which the support contract is applied is uninstalled, the serial number of the server is deleted from the record in the software contract state management table 152 corresponding to the software shipping specifying number of the software (refer to FIG. 19). In a case where the software to which the support contract is not applied is uninstalled, the record corresponding to the software shipping specifying number of the software is deleted from the software contract state management table 152.

Next, a responding process when there is an inquiry is described.

Figure 26:
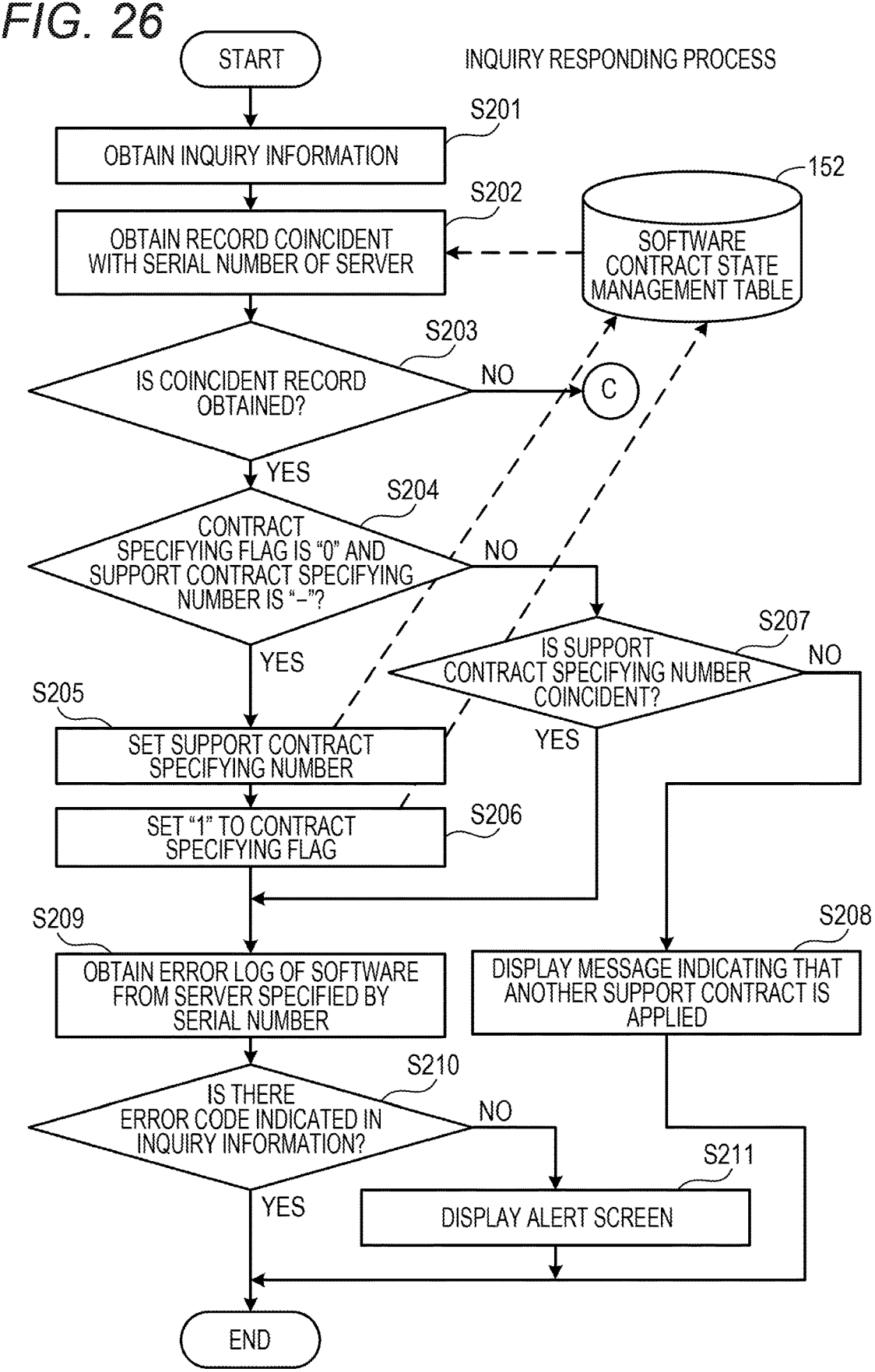
FIG. 26 is a flowchart (1/2) illustrating an example of a procedure of an inquiry responding process.

FIG. 26 is a flowchart (1/2) illustrating an example of a procedure of an inquiry responding process. Hereinafter, a process illustrated in FIG. 26 is described along step numbers.

[Step S201] The support license managing unit 150 obtains the inquiry information from the terminal device 35 of the customer company or the terminal device 41 used by the operator 53 receiving the telephone inquiry. The inquiry information includes the serial number of the server, the support contract specifying number, and an error code of the error which occurs.

[Step S202] The support license managing unit 150 obtains the record coincident with the serial number of the server indicated in the inquiry information obtained at step S201 from the software contract state management table 152.

[Step S203] The support license managing unit 150 determines whether a coincident record may be obtained at step S202. A case where the corresponding record cannot be obtained at step S202 is a case where the software to which the support contract is applied is uninstalled from the server. In a case where the record may be obtained, the support license managing unit 150 shifts the procedure to step S204. In a case where the record cannot be obtained, the support license managing unit 150 shifts the procedure to step S221 (refer to FIG. 27).

[Step S204] The support license managing unit 150 determines whether the obtained record satisfies a condition that the contract specifying flag is "0" and the support contract specifying number is "- (blank)". In a case where the condition is satisfied, the support license managing unit 150 shifts the procedure to step S205. In a case where the condition is not satisfied, the support license managing unit 150 shifts the procedure to step S207.

[Step S205] The support license managing unit 150 sets the support contract specifying number indicated in the inquiry information in the obtained record in the software contract state management table 152.

In the second embodiment, the inquiry is made on the basis of the inquiry time operation screen 61 as illustrated in FIGS. 12 and 13. Therefore, the support contract specifying number included in the inquiry information is the support contract specifying number of the support contract the software to which this is applied is not yet determined. Therefore, the same support contract specifying number is never set redundantly for different records. That is, the support contract is only applied to the pieces of software as many as the support contract specifying numbers.

Note that it is also possible to make an inquiry even from other than the inquiry time operation screen 61. In this case, it is not assured that the support contract specifying number included in the inquiry information is of the support contract the software to which this is applied is not determined. Therefore, before performing the process at step S205, for example, the support license managing unit 150 confirms that the support contract specifying number included in the inquiry information is not set in the record other than the record obtained at step S202. Also, before performing the process at step S205, for example, the support license managing unit 150 confirms that the support contract specifying number included in the inquiry information is set in any record in the support contract management DB 130. When such point to be checked may be checked, the support license managing unit 150 executes the process at step S205. As a result, it is possible to suppress an erroneous support contract specifying number from being set.

[Step S206] The support license managing unit 150 sets "1" in the contract specifying flag of the obtained record in the software contract state management table 152. The support license managing unit 150 thereafter shifts the procedure to step S209.

[Step S207] The support license managing unit 150 determines whether the support contract specifying number of the obtained record coincides with the support contract specifying number indicated in the obtained inquiry information. In a case where the support contract specifying numbers coincide, the support license managing unit 150 shifts the procedure to step S209. Also, in a case where the support contract specifying numbers do not coincide, the support license managing unit 150 shifts the procedure to step S208.

[Step S208] The support license managing unit 150 allows the terminal device 35 or the terminal device 41 to display a message indicating that a support contract different from the support contract of the support contract specifying number indicated in the inquiry information is applied to the software which is the target of the inquiry. Thereafter, the procedure ends.

[Step S209] The support license managing unit 150 specifies the server by the serial number of the server indicated in the inquiry information and obtains the error log of the software from the remote agent of the corresponding server.

[Step S210] The support license managing unit 150 determines whether the error code indicated in the inquiry information is included in the error log obtained at step S209. In a case where there is a corresponding error code, the support license managing unit 150 finishes the procedure. If there is no corresponding error code, the support license managing unit 150 shifts the procedure to step S211.

[Step S211] The support license managing unit 150 displays an alert on the terminal device 35 or the terminal device 41, indicating that there is a possibility of an error in a server different from the server indicated in the inquiry information. For example, the inquiry time operation screen 62 as illustrated in FIG. 16 is displayed. Thereafter, the procedure ends.

Figure 27:
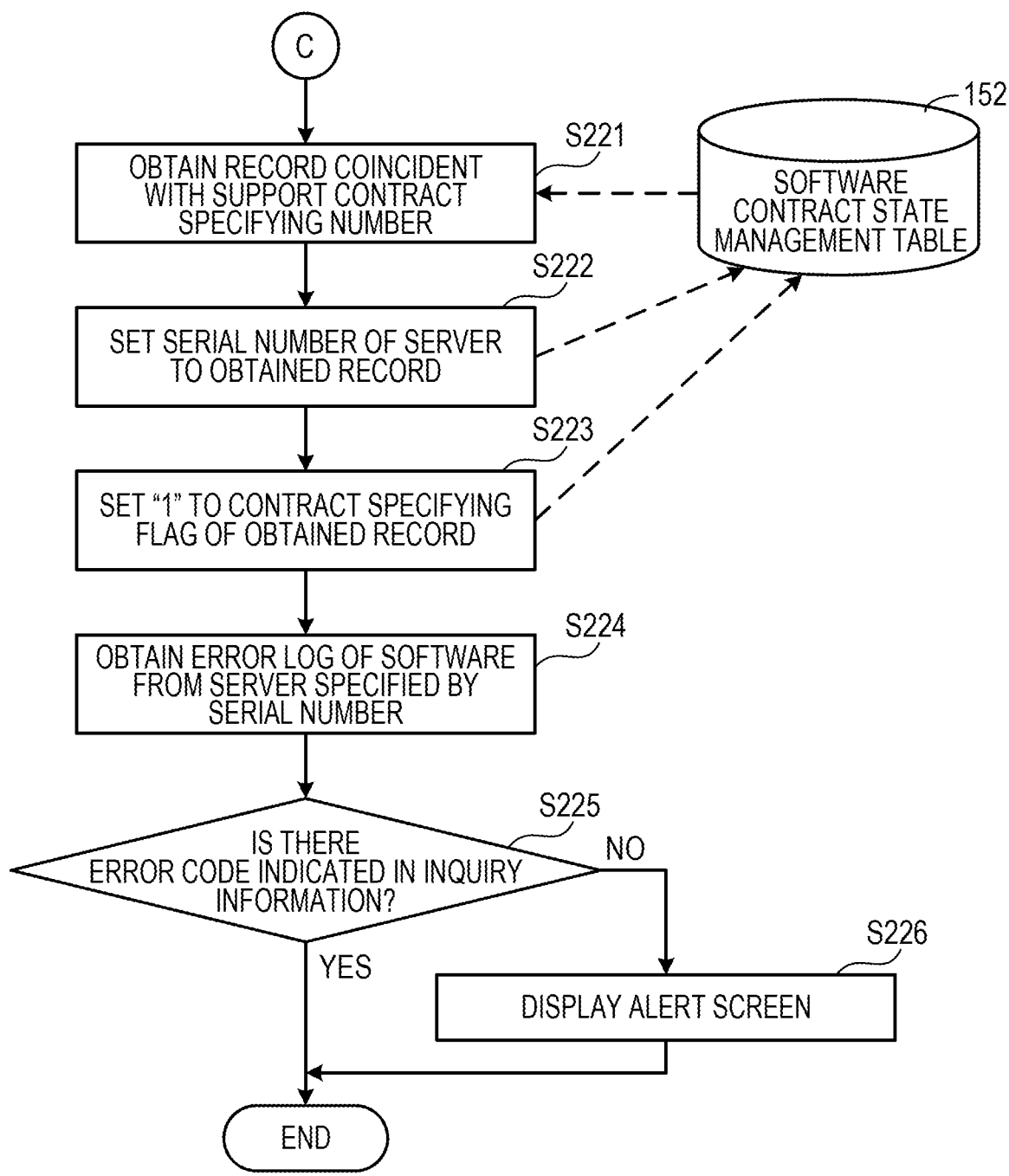
FIG. 27 is a flowchart (2/2) illustrating an example of the procedure of the inquiry responding process.

FIG. 27 is a flowchart (2/2) illustrating an example of the procedure of the inquiry responding process. Hereinafter, the process illustrated in FIG. 27 is described along the step number.

[Step S221] The support license managing unit 150 obtains the record coincident with the support contract specifying number indicated in the inquiry information from the software contract state management table 152.

[Step S222] The support license managing unit 150 sets the serial number of the server indicated in the inquiry information in the obtained record in the software contract state management table 152.

[Step S223] The support license managing unit 150 sets "1" in the contract specifying flag of the obtained record in the software contract state management table 152.

[Step S224] The support license managing unit 150 specifies the server based on the serial number of the server indicated in the inquiry information and obtains the error log of the software from the remote agent of the corresponding server.

[Step S225] The support license managing unit 150 determines whether the error code indicated in the inquiry information is included in the error log obtained at step S224. In a case where there is a corresponding error code, the support license managing unit 150 finishes the procedure. If there is no corresponding error code, the support license managing unit 150 shifts the procedure to step S226.

[Step S226] The support license managing unit 150 displays an alert on the terminal device 35 or the terminal device 41, indicating that there is a possibility of an error in a server different from the server indicated in the inquiry information.

In this manner, by displaying an alert unless a software error occurs in the server indicated in the inquiry information, it is possible to suppress support for erroneous software.

Next, the contract period automatic checking process is described in detail.

Figure 28:
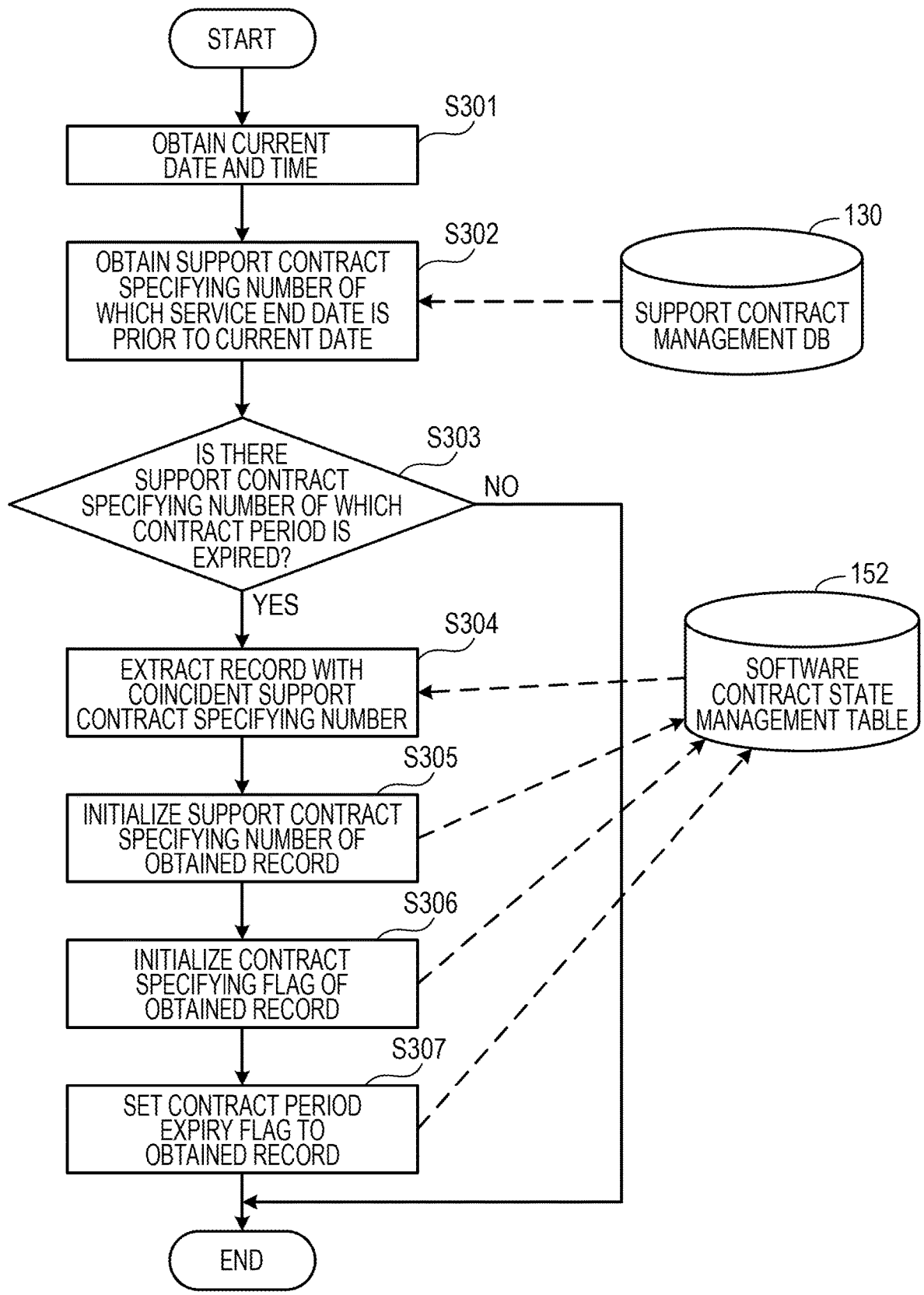
FIG. 28 is a flowchart illustrating an example of a contract period automatic checking process.

FIG. 28 is a flowchart illustrating an example of a procedure of the contract period automatic checking process. Hereinafter, the process illustrated in FIG. 28 is described along the step number. Note that the contract period automatic checking process is periodically executed at predetermined time intervals (for example, one day).

[Step S301] The support license managing unit 150 obtains the current date and time.

[Step S302] The support license managing unit 150 obtains the support contract specifying number from the record whose service end date is before the current date from the support contract management DB 130.

[Step S303] The support license managing unit 150 determines whether the support contract specifying number indicating the expired support contract is obtained at step S302. In a case where the corresponding support contract specifying number is obtained, the support license managing unit 150 shifts the procedure to step S304. Also, in a case where the corresponding support contract specifying number cannot be obtained, the support license managing unit 150 ends the procedure.

[Step S304] The support license managing unit 150 obtains from the software contract state management table 152 a record coincident with the obtained support contract specifying number.

[Step S305] The support license managing unit 150 initializes the support contract specifying number of the obtained record in the software contract state management table 152 to "-" (blank).

[Step S306] The support license managing unit 150 initializes the contract specifying flag of the obtained record in the software contract state management table 152 to "0".

[Step S307] The support license managing unit 150 sets "1" in the contract period expiry flag of the obtained record in the software contract state management table 152. Thereafter, the procedure ends.

In this manner, the contract period is automatically checked, the software to which the expired support contract is applied is detected, and the contract state expiry flag is set in association with the software. As a result, even if there is an inquiry about the support regarding the software to which the expired support contract is applied thereafter, it is possible to display a message indicating expiration of contract as illustrated in FIG. 22 on the terminal devices 35 and 41. As a result, the implementation of the support to which the expired support contract is applied is suppressed.

Other Embodiments

In the second embodiment, the remote agent is implemented in the servers 31 to 34 in the customer company 30 and the management device 100 obtains the information from the remote agent; however, the information may also be obtained by other methods. For example, there is a case where an information transmission circuit for externally outputting an error log is incorporated in the servers 31 to 34. In a case where such information transmission circuit is provided, information such as an error log may be obtained from the information transmission circuit instead of the remote agent.

The above merely describes the principle of the present invention. Furthermore, numerous modifications and variations are available for those skilled in the art, the present invention is not limited to the correct configuration and application example illustrated and described above, and all corresponding variations and equivalents are regarded within the scope of the present invention by appended claims and equivalents thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium recording a management program allowing a computer to execute a process of:

obtaining a support request for first software including first individual information which identifies a first device which is used by a user and a product name of the first software which is implemented in the first device;

referring to a storage which stores second individual information which identifies a second device in which second software, which is included in a support contract for the user regarding software having the product name, is implemented; and in a case where the second individual information coincident with the first individual information in the support request is not stored in the storage and a number of pieces of the second individual information in the storage is smaller than a number of pieces of support which indicates a number of pieces of software supportable based on the support contract, storing the first individual information in the support request to the storage as the second individual information, wherein the support request includes first error information related to the support request;

obtaining second error information which is output by the first software from the first device in a case where the second individual information coincident with the first individual information is stored in the storage;

comparing the first error information and the second error information; and outputting a message which indicates that no error occurs in the first software in a case where there is no second error information coincident with the first error information.

2. The non-transitory computer-readable recording medium according to claim 1, wherein the storage stores one of support contract specifying numbers corresponding to the number of pieces of support in association with the second individual information of each second device, and in the storage, in a case where there is no second individual information associated with the support contract specifying number and coincident with the first individual information and there is at least one support contract specifying number which is not associated with the second individual information, stores the at least one of the support contract specifying numbers which is not associated with the second individual information in the storage in association with the first individual information.

3. The non-transitory computer-readable recording medium management program according to claim 2, wherein the storage stores one of software shipping specifying numbers as many as a number of pieces of the software having the product name which is sold to the user in association with implemented individual information which identifies an implemented device in which the software having the product name is implemented out of devices which are owned by the user, the implemented individual information to which the support contract specifying number is associated out of the implemented individual information being discriminated as the second individual information, and the support contract specifying number not associated with the implemented individual information is stored in the storage in association with the implemented individual information coincident with the first individual information indicated in the support request.

4. The non-transitory computer-readable recording medium according to claim 2, wherein the process further includes: deleting, in a case where an uninstallation of a software having the product name from a device which is owned by the user is detected, the second individual information coincident with individual information which identifies the device from the storage; and storing, in a case where an installation of the software having the product name in the device is detected, individual information which identifies the device in the storage as new second individual information in association with the support contract specifying number associated with the deleted second individual information.

5. The non-transitory computer-readable recording medium management program according to claim 1, wherein the process further includes: transmitting screen data which displays a first object indicating the support contract a support application target of which is not yet determined and a second object indicating the first device to a terminal device which is used by the user in a case where the number of pieces of second individual information stored in the storage is smaller than the number of pieces of support.

6. The non-transitory computer-readable recording medium according to claim 1, wherein the process further includes: counting up a number of detected installations indicating a number of devices on which the software having the product name is installed in a case where it is detected that the software having the product name is installed on a device which is owned by the user; and outputting a message indicating excess in number of installations in a case where the number of detected installations exceeds a number of pieces of the software having the product name which is sold to the user.

7. A method comprising:

obtaining, by a computer, a support request for first software including first individual information which identifies a first device which is used by a user and a product name of the first software which is implemented in the first device;

referring to a storage which stores second individual information which identifies a second device in which second software, which is included in a support contract for the user regarding software having the product name, is implemented;

in a case where the second individual information coincident with the first individual information in the support request is not stored in the storage and a number of pieces of the second individual information in the storage is smaller than a number of pieces of support which indicates a number of pieces of software supportable based on the support contract, storing the first individual information in the support request to the storage as the second individual information, wherein the support request includes first error information related to the support request;

obtaining second error information which is output by the first software from the first device in a case where the second individual information coincident with the first individual information is stored in the storage;

comparing the first error information and the second error information; and outputting a message which indicates that no error occurs in the first software in a case where there is no second error information coincident with the first error information.

8. The method according to claim 7, wherein the storage stores one of support contract specifying numbers corresponding to the number of pieces of support in association with the second individual information of each second device, and in the storage, in a case where there is no second individual information associated with the support contract specifying number and coincident with the first individual information and there is at least one support contract specifying number which is not associated with the second individual information, stores the at least one of the support contract specifying numbers which is not associated with the second individual information in the storage in association with the first individual information.

9. The method according to claim 8, wherein the storage stores one of software shipping specifying numbers as many as a number of pieces of the software having the product name which is sold to the user in association with implemented individual information which identifies an implemented device in which the software having the product name is implemented out of devices which are owned by the user, the implemented individual information to which the support contract specifying number is associated out of the implemented individual information being discriminated as the second individual information, and the support contract specifying number not associated with the implemented individual information is stored in the storage in association with the implemented individual information coincident with the first individual information indicated in the support request.

10. The method according to claim 8, further comprising: deleting, in a case where an uninstallation of a software having the product name from a device which is owned by the user is detected, the second individual information coincident with individual information which identifies the device from the storage; and storing, in a case where an installation of the software having the product name in the device is detected, individual information which identifies the device in the storage as new second individual information in association with the support contract specifying number associated with the deleted second individual information.

11. The method according to claim 7, further comprising: transmitting screen data which displays a first object indicating the support contract a support application target of which is not yet determined and a second object indicating the first device to a terminal device which is used by the user in a case where the number of pieces of second individual information stored in the storage is smaller than the number of pieces of support.

12. The method according to claim 7, wherein the process further includes: counting up a number of detected installations indicating a number of devices on which the software having the product name is installed in a case where it is detected that the software having the product name is installed on a device which is owned by the user; and outputting a message indicating excess in number of installations in a case where the number of detected installations exceeds a number of pieces of the software having the product name which is sold to the user.

\* \* \* \* \*